(12) United States Patent
Lu et al.

(10) Patent No.: US 9,335,750 B2
(45) Date of Patent: *May 10, 2016

(54) LIGHT FIXTURE ADAPTER (LFA) SECURITY MONITORING

(71) Applicant: ADVANERGY, INC, Winnetka, CA (US)

(72) Inventors: Jin Lu, Oak Park, CA (US); Lee Cheung, Thousand Oaks, CA (US); Todd Scott Kelly, Winnetka, CA (US)

(73) Assignee: ADVANERGY, INC., Winnetka, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 13/909,044

(22) Filed: Jun. 3, 2013

(65) Prior Publication Data

US 2013/0261774 A1 Oct. 3, 2013

Related U.S. Application Data

(63) Continuation-in-part of application No. 13/844,491, filed on Mar. 15, 2013, now Pat. No. 8,826,046, and a continuation-in-part of application No. 13/907,599, filed on May 31, 2013, now Pat. No. 8,649,883, which (Continued)

(51) Int. Cl.
*G06F 1/26* (2006.01)
*G05B 15/02* (2006.01)
(Continued)

(52) U.S. Cl.
CPC ............ *G05B 15/02* (2013.01); *H04L 12/2807* (2013.01); *H04L 12/2818* (2013.01);
(Continued)

(58) Field of Classification Search
CPC .................................. G06F 1/26; G05B 15/02
USPC .......................................... 713/300; 315/291
See application file for complete search history.

(56) References Cited

U.S. PATENT DOCUMENTS

| 4,388,563 | A | 6/1983 | Hyltin |
| 5,101,142 | A | 3/1992 | Chatfield |

(Continued)

OTHER PUBLICATIONS

International Rectifier IR2156(S)PbF, Ballast Control IC, "Qualification Lead-free MSL3, industrial"—www.irf.com, 2012, pp. 1-21.

(Continued)

*Primary Examiner* — Chun Cao
(74) *Attorney, Agent, or Firm* — David W. Carstens; Kevin M. Klughart; Carstens & Cahoo, LLP

(57) ABSTRACT

A security monitoring system/method implementing distributed Internet-based environmental monitoring and control is disclosed. The system utilizes a smart gateway power controller (SGPC) configured for new/retrofit installation into electrical power distribution networks to allow controlled connection of an AC power source to a customer load device under direction of local or remote Internet direction. The SGPC may also be configured with sensors to detect motion, audio, video, visual images, smoke, carbon monoxide, carbon dioxide, light/darkness, and other environmental data. The SGPC may be configured using a local web-based graphical user interface (GUI) to relay collected sensor information to a remote web browser hosted on a remote computing device. The GUI may incorporate a configuration/setup interface allowing mapping of sensor data to information associated with the sensor location and triggered security reports to occur based on collected sensor data.

18 Claims, 32 Drawing Sheets

Related U.S. Application Data is a continuation-in-part of application No. 13/844,491, filed on Mar. 15, 2013, now Pat. No. 8,826,046, which is a continuation-in-part of application No. 13/840,022, filed on Mar. 15, 2013, now Pat. No. 8,769,327, which is a continuation-in-part of application No. 13/645,080, filed on Oct. 4, 2012, now Pat. No. 8,443,071, and a continuation-in-part of application No. 13/645,044, filed on Oct. 4, 2012, now Pat. No. 8,761,050, which is a continuation-in-part of application No. 13/644,995, filed on Oct. 4, 2012, now Pat. No. 8,583,955, which is a continuation-in-part of application No. 13/644,795, filed on Oct. 4, 2012, now Pat. No. 8,478,450, said application No. 13/840,022 is a continuation-in-part of application No. PCT/US2012/058788, filed on Oct. 4, 2012, and a continuation-in-part of application No. PCT/US2012/058781, filed on Oct. 4, 2012, and a continuation-in-part of application No. PCT/US2012/058771, filed on Oct. 4, 2012, and a continuation-in-part of application No. PCT/US2012/058761, filed on Oct. 4, 2012.

(60) Provisional application No. 61/698,288, filed on Sep. 7, 2012, provisional application No. 61/667,477, filed on Jul. 3, 2012, provisional application No. 61/661,100, filed on Jun. 18, 2012, provisional application No. 61/655,099, filed on Jun. 4, 2012, provisional application No. 61/542,811, filed on Oct. 4, 2011.

(51) Int. Cl.
  *H04L 12/28* (2006.01)
  *H04L 12/66* (2006.01)

(52) U.S. Cl.
  CPC ........ *H04L12/2825* (2013.01); *H04L 12/2836* (2013.01); *H04L 12/66* (2013.01); *G05B 2219/2642* (2013.01); *G06F 1/26* (2013.01); *Y02B 70/325* (2013.01); *Y02B 70/3241* (2013.01); *Y04S 20/227* (2013.01); *Y04S 20/228* (2013.01)

(56) References Cited

U.S. PATENT DOCUMENTS

| | | | |
|---|---|---|---|
| 6,366,032 | B1 | 4/2002 | Allison et al. |
| 7,573,208 | B2 | 8/2009 | Newman, Jr. |
| 8,255,090 | B2 * | 8/2012 | Frader-Thompson et al. .................... 700/295 |
| 8,278,838 | B2 | 10/2012 | Shen |
| 8,531,134 | B2 * | 9/2013 | Chemel et al. ................ 315/308 |
| 8,754,589 | B2 * | 6/2014 | Chemel et al. ................ 315/297 |
| 8,826,046 | B2 * | 9/2014 | Lu et al. ........................ 713/300 |
| 2005/0125083 | A1 * | 6/2005 | Kiko ................................ 700/19 |
| 2009/0262189 | A1 | 10/2009 | Marman |
| 2010/0148672 | A1 | 6/2010 | Hopper |
| 2010/0164397 | A1 | 7/2010 | Shen |
| 2012/0007511 | A1 * | 1/2012 | Choong et al. ................ 315/152 |
| 2012/0133287 | A1 | 5/2012 | Steiner et al. |
| 2012/0136485 | A1 | 5/2012 | Weber et al. |

OTHER PUBLICATIONS

International Rectifier IR2520D(S) & (PbF), Adaptive Ballast Control IC; www.irf.com, Mar. 1, 2005, pp. 1-17.

Contenti, Cecilia—International Rectifier Application Note AN-1062: "IRPLMB1E-25W 230VAC Small Size Ballast Using IR250D"—Mar. 2, 2004, pp. 1-13.

Tjokrorahardjo, Andre—Power Electronics Technology Magazine, "Simple, Versatile Control IC Dims Fluorescent Ballasts" —Mar. 2010 pp. 26-31.

American National Standard Lighting Group—ANSI_ANSLG C81.61-2007 (Revision of ANSI C81.61-2006) American National Standard for Electric Lamp Bases—Specifications for Bases (Caps) for Electric Lamps, www.wangd.com, 2007, 103 pages.

American National Standard Lighting Group—ANSI_IEC C81.62-2007 (Revision of ANSI C81.62-2006) American National Standard for Electric Lampholders—www. wangd.com, 2007, 74 pages.

Fluorescent Ballasts Wiring Diagrams, www.atlaslightingproducts.com, date unknown, 1 page.

Experiment Electronic Ballast—Electronic Ballast for Fluorescent Lamps, Revised Sep. 18, 2012. 20 pages.

* cited by examiner

*Prior Art*

2200

FIG. 23
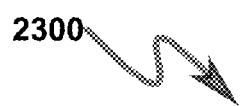
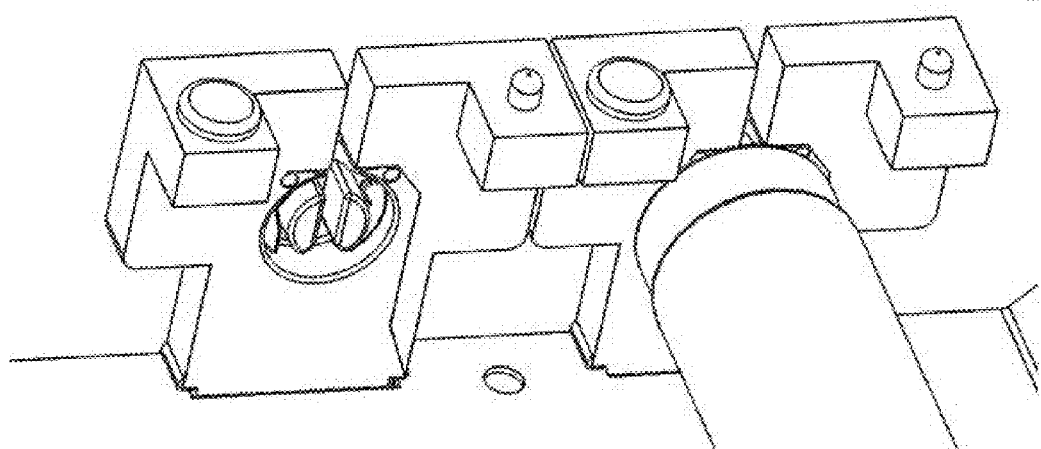

FIG. 25
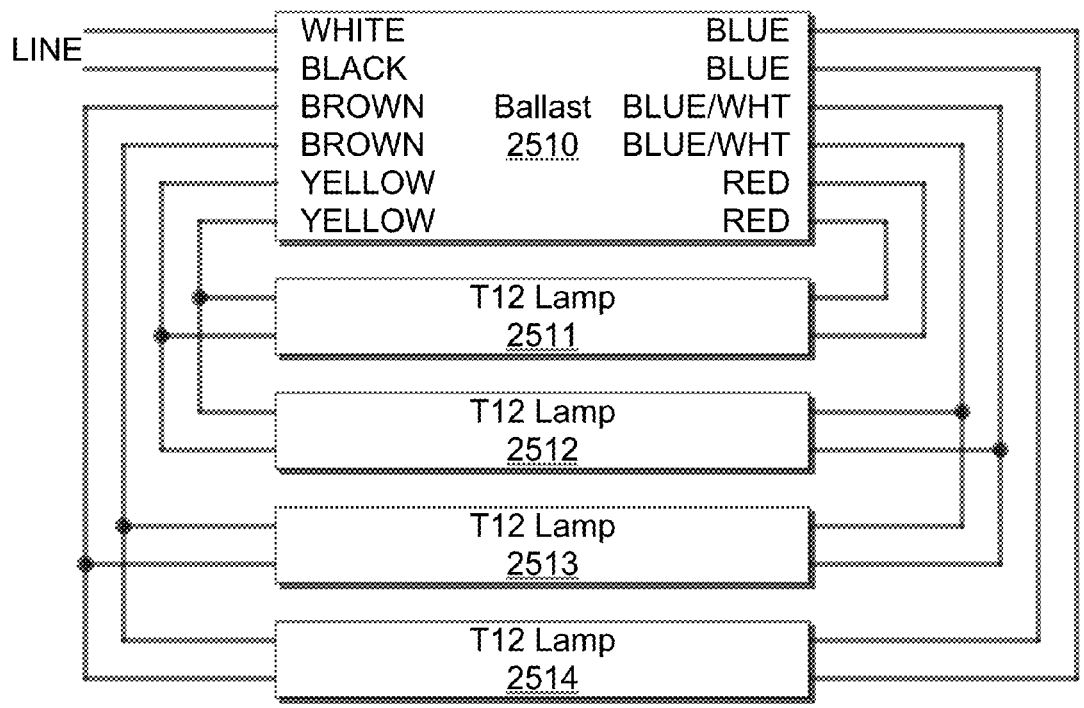
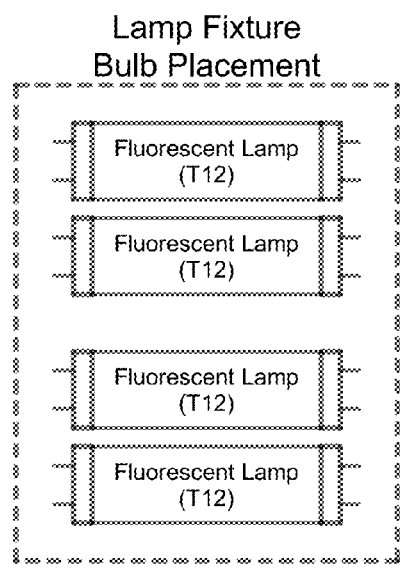
Lamp Fixture
Bulb Placement
*Prior Art*

FIG. 26
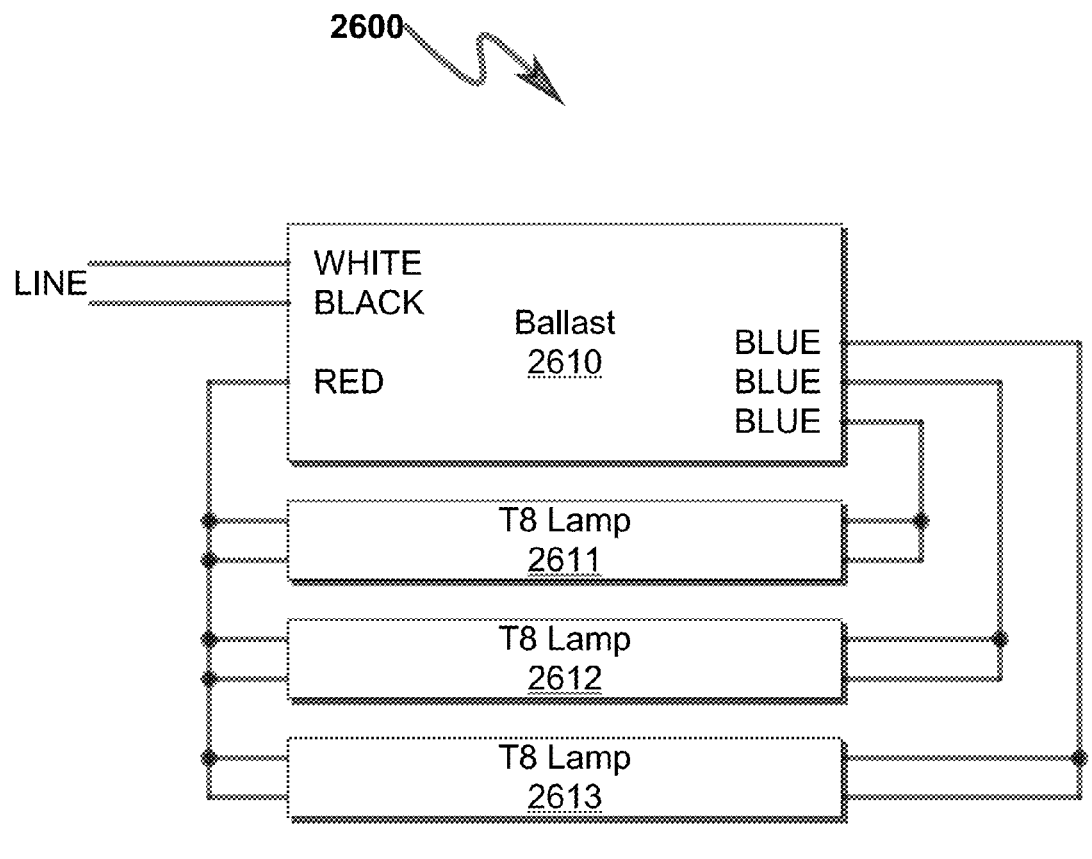
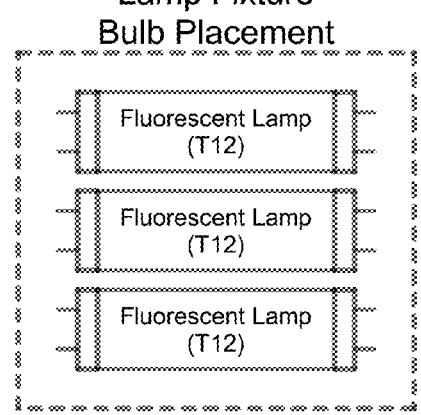
*Prior Art*

LIGHT FIXTURE ADAPTER (LFA) SECURITY MONITORING

CROSS REFERENCE TO RELATED APPLICATIONS

U.S. CIP Patent Applications

This application is a Continuation-In-Part and incorporates by reference United States Utility Patent Application for LIGHT FIXTURE MONITORING/CONTROL SYSTEM AND METHOD by inventors Jin (nmn) Lu, Todd Scott Kelly, and Lee (nmn) Cheung, filed electronically with the USPTO on Mar. 15, 2013, with Ser. No. 13/844,491, issued as U.S. Pat. No. 8,826,046. This parent application will be referred to as "Document LFSM."

U.S. Utility Patent Applications

This application claims benefit under 35 U.S.C. §120 and incorporates by reference United States Utility Patent Application for POWER DISTRIBUTION SYSTEM AND METHOD by inventors Jin (nmn) Lu, Todd Scott Kelly, and Lee (nmn) Cheung, filed electronically with the USPTO on May 31, 2013, with Ser. No. 13/907,599, issued as U.S. Pat. No. 8,649,883. This application will be referred to as "Document PDSM."

This application claims benefit under 35 U.S.C. §120 and incorporates by reference United States Utility Patent Application for LIGHT FIXTURE MONITORING/CONTROL SYSTEM AND METHOD by inventors Jin (nmn) Lu, Todd Scott Kelly, and Lee (nmn) Cheung, filed electronically with the USPTO on Mar. 15, 2013, with Ser. No. 13/844,491, issued as U.S. Pat. No. 8,826,046.

This application claims benefit under 35 U.S.C. §120 and incorporates by reference United States Utility Patent. Application for BATTERY CHARGER MANAGEMENT SYSTEM AND METHOD by inventors Jin (nmn) Lu and Todd Scott Kelly, filed electronically with the USPTO on Mar. 15, 2013, with Ser. No. 13/840,022, issued as U.S. Pat. No. 8,769,327.

This application claims benefit under 35 U.S.C. §120 and incorporates by reference United States Utility Patent Application for DATA SERVER SYSTEM AND METHOD by inventors Jin (nmn) Lu and Todd Scott Kelly, filed electronically with the USPTO on Oct. 4, 2012, with Ser. No. 13/645,080, issued as U.S. Pat. No. 8,443,071.

This application claims benefit under 35 U.S.C. §120 and incorporates by reference United States Utility Patent Application for NETWORK INTEGRATION SYSTEM AND METHOD by inventors Jin (nmn) Lu and Todd Scott Kelly, filed electronically with the USPTO on Oct. 4, 2012, with Ser. No. 13/645,044, issued as U.S. Pat. No. 8,761,050.

This application claims benefit under 35 U.S.C §120 and incorporates by reference United States Utility Patent Application for BATTERY MANAGEMENT SYSTEM AND METHOD by Jin (nmn) Lu, Todd Scott Kelly, and Lee (nmn) Cheung, filed electronically with the USPTO on Oct. 4, 2012, with Ser No. 13/644,995, issued as U.S. Pat. No. 8,583,955.

This application claims benefit under 35 U.S.C. §120 and incorporates by reference United States Utility Patent Application for POWER CONTROL SYSTEM AND METHOD by inventors Jin (nmn) Lu, Todd Scott Kelly, and Lee (nmn) Cheung, filed electronically with the USPTO on Oct. 4, 2012, with Ser. No. 13/644,795, issued as U.S. Pat. No. 8,478,450. This application will be referred to as "Document PCSM."

PCT Patent Applications

This application claims benefit under 35 U.S.C. §120 and incorporates by reference PCT Patent Application for DATA SERVER SYSTEM AND METHOD by inventors Jin (nmn) Lu and Todd Scott Kelly, filed electronically with the USPTO on Oct. 4, 2012, with Serial Number PCT/US12/58788.

This application claims benefit under 35 U.S.C. §120 and incorporates by reference PCT Patent Application for NETWORK INTEGRATION SYSTEM AND METHOD by inventors Jin (nmn) Lu and Todd Scott Kelly, filed electronically with the USPTO on Oct. 4, 2012, with Serial Number PCT/US12/58781.

This application claims benefit under 35 U.S.C, §120 and incorporates by reference PCT Patent Application for BATTERY MANAGEMENT SYSTEM AND METHOD by Jin (nmn) Lu, Todd Scott Kelly, and Lee (nmn) Cheung, filed electronically with the USPTO on Oct. 4, 2012, with Serial Number PCT/US12/58771.

This application claims benefit under 35 U.S.C. §120 and incorporates by reference PCT Patent Application for POWER CONTROL SYSTEM AND METHOD by inventors Jin (nmn) Lu, Todd Scott Kelly, and Lee (nmn) Cheung, filed electronically with the USPTO on Oct. 4, 2012, with Serial Number PCT/US12/58761.

U.S. Provisional Patent Applications

This application claims benefit under 35 U.S.C. §119 and incorporates by reference United States Provisional Patent Application for DATA SERVER SYSTEM AND METHOD by inventors Jin (nmn) Lu and Todd Scott Kelly, filed electronically with the USPTO on Sep. 7, 2012, with Ser. No. 61/698288.

This application claims benefit under 35 U.S.C. §119 and incorporates by reference United States Provisional Patent Application for NETWORK INTEGRATION SYSTEM AND METHOD by inventors Jin (nmn) Lu and Todd Scott Kelly, filed electronically with the USPTO on Jul. 3, 2012, with Ser. No. 61/667,477.

This application claims benefit under 35 U.S.C. §119 and incorporates by reference United States Provisional Patent Application for POWER CONTROL SYSTEM AND METHOD by inventors Jin (nmn) Lu, Todd Scott Kelly, and Lee (nmn) Cheung, filed electronically with the USPTO on Jun. 18, 2012, with Ser. No. 61/661,100.

This application claims benefit under 35 U.S.C. §119 and incorporates by reference United States Provisional Patent Application for BATTERY MANAGEMENT SYSTEM AND METHOD by Jin (nmn) Lu, Todd Scott Kelly, and Lee (nmn) Cheung, filed electronically with the USPTO on Jun. 4, 2012, with Ser. No. 61/655,099.

This application claims benefit under 35 U.S.C. §119 and incorporates by reference United States Provisional Patent Application for SMART BATTERY CONTROLLER by inventor Jin (nmn) Lu, filed electronically with the USPTO on Oct. 4, 2011, with Ser. No. 61/542,811.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods that provide security monitoring and control functions within the context of an internal building structure or other environment such as external building/city street/road infrastructures. Specifically, the present invention in many preferred embodiments has application to home/commercial/government power control automation systems in which electrical power to customer loads may is controlled via commands received from a local or remote computer network and in which sensors associated with this control system monitor and report information about the environment in which the system operates. These security monitoring applications have particular application in detecting, thwarting, and investigating terrorist events, especially in the context of protecting governmental and commercial infrastructures.

In many preferred embodiments the present invention allows sensors to be monitored and electrical loads to be controlled locally or remotely via an Internet-capable device (e.g., a smartphone, a tablet, or laptop) and provides a non-intrusive, secure, and blended load control interface that is compatible with home and commercial computer networks.

In many preferred embodiments the present invention allows the electrical infrastructure within new or old construction to be upgraded to include sensor monitoring and local/remote control of electrical loads without the need for additional infrastructure-specific support of these switching and monitoring functions.

Without limiting the scope of the present invention, the general field of invention scope may fall into one or more U.S. patent classifications including 315/149; 315/205, 315/209; 315/226; 315/291; 315/294; 315/307; and 315/308.

PRIOR ART AND BACKGROUND OF THE INVENTION

Background

Due to recent events involving domestic terrorism in the United States and elsewhere there is an increased demand for security monitoring and control systems that can be deployed in public areas and within building infrastructures. Security professionals generally agree that at a minimum the ability to provide high quality video monitoring in public areas is a minimum requirement for detecting, thwarting, and investigating terrorist events. The recent bombings associated with the 2013 Boston Marathon are an excellent example of how video and image processing may be used to investigate a domestic terrorist event and thwart additional events from being initiated by the terrorists.

Unfortunately, much of the information associated with video surveillance used in this type of investigation must be gathered from a wide variety of independent recording sources and as such it is often difficult and time consuming to collect and process this information for use by government officials in reacting to a terrorist event such as that occurring in Boston.

Furthermore, while the need for deploying security systems incorporating video has never been greater, the cost of implementing these systems is quite high because in most cases the infrastructure necessary to implement widespread (building-wide, plant-wide, city-wide, etc.) does not exist and must be created/customized for the environment in which security monitoring is to be deployed. This high cost of implementation and deployment as well as the difficulty in accessing and collecting the data severely limits the ability for security professionals to collect necessary information needed to prevent terrorist threats and investigate terrorist events.

Prior Art Overview

Putting a switch and/or a dimmer in a light bulb socket adapter is described in U.S. Pat. No. 7,573,208 (METHOD OF PROGRAMMING A LIGHTING PRESET FROM A RADIO-FREQUENCY REMOTE CONTROL) and U.S. Pat. No. 8,278,838 (DIMMER DEVICE WITH FEEDBACK FUNCTION) and the references mentioned therein discuss such a device. The socket adaptor (as generally depicted in U.S. Pat. No. 8,278,838) has one end screwed into a standard light bulb socket, and the other end is a standard receptacle configured to receive a standard light bulb. The socket adapter housing contains the control logic that can turn ON and OFF and dim the light bulb by regulating the current. The light bulbs can be of any type and include incandescent bulbs, CFL, and LED-based lamps.

Electronic fluorescent ballasts such as that detailed in U.S. Pat. No. 4,388,563 (SOLID-STATE FLUORESCENT LAMP BALLAST), U.S. Pat. No. 6,366,032 (FLUORESCENT LAMP BALLAST WITH INTEGRATED CIRCUIT), and U.S. Pat. No. 5,101,142 (SOLID-STATE BALLAST FOR FLUORESCENT LAMP WITH MULTIPLE DIMMING) are known in the art and have undergone significant improvements in the past decade with respect to improving energy efficiency, lamp lifetime, and overall system implementation cost.

While these prior art configurations provide some form of lighting control, meshed-network integrated Internet-based security monitoring and control has yet to be addressed by these prior art configurations.

Deficiencies in the Prior Art

The prior art as detailed above suffers from the following deficiencies:
  Prior art security monitoring systems incur significant delays in data collection before and after a terrorist event occurs, resulting in unacceptable delays in analyzing data collected from associated security video monitoring systems.
  Prior art security monitoring systems generally do not permit integration of disparate types of communication networks.

Prior art security monitoring systems generally do not interface well with the Internet and rely on proprietary interface protocols operating within a locally defined network interface to affect security monitoring functions.

Prior art security monitoring systems generally do not permit "nesting" or "subnetting" of control networks to define hierarchical control domains that can be accessed remotely via the Internet or some other network interface.

Prior art security monitoring systems generally do not permit easy or cost effective retrofitting into existing electrical distribution infrastructures.

Prior art security monitoring systems generally do not permit easy expansion of sensor detector functions other than video/audio.

Prior art security monitoring systems generally do not permit rapid collection of sensor information from a variety of disparate security monitoring systems.

While some of the prior art may teach some solutions to several of these problems, the core issue of integrating disparate security monitoring networks with Internet based communication control systems has not been solved by the prior art.

OBJECTIVES OF THE INVENTION

Accordingly, the objectives of the present invention are (among others) to circumvent the deficiencies in the prior art and affect the following objectives in the context of a Smart Gateway Power Controller (SGPC):

(1) Provide for a security monitoring system and method that permits instantaneous collection of security monitoring information associated with a planned or completed terrorist event.

(2) Provide for a security monitoring system and method that permits seamless integration of disparate security monitoring networks with no change or addition to the security monitoring network being necessary.

(3) Provide for a security monitoring system and method that permits integration with the Internet to support widespread access to security monitoring data.

(4) Provide for a security monitoring system and method that permits "nesting" and "subnetting" of control networks to define hierarchical control security control domains that can be accessed remotely via the Internet or other network interface.

(5) Provide for a security monitoring system and method that permits easy and cost effective retrofitting into existing electrical distribution infrastructures.

(6) Provide for a security monitoring system and method that permits rapid retrofitting into existing electrical distribution infrastructures in older buildings and specifically older government buildings with ageing infrastructures.

(7) Provide for a security monitoring system and method that permits expansion of sensor detection functions beyond image/video to include other environmental conditions such as smoke, fire, carbon monoxide, radiation, etc. to allow networks of security monitors to "mesh" large areas and provide monitoring of additional conditions within an overall threat matrix.

(8) Provide for a security monitoring system and method that permits rapid collection of sensor information from a variety of disparate security monitoring systems. This functionality can be used to track dispersion of airborne threats such as radiation, biological contamination, etc.

(9) Provide for a security monitoring system and method that permits environmental sensor data to trigger electrical contacts and other localized security functions.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

Overview

The present invention as embodied in a system and method utilizes Smart Gateway Power Controller (SGPC) modules configured with power switching and remote sensing capability in a mesh network of cooperating security monitoring/control systems that may be retrofitted into existing electrical infrastructures to provide Internet accessible security monitoring and control functions. A detailed description of the SGPC hardware and power switching software is provided in Document PCSM. A detailed description of the SGPC hardware and power switching software as applied to retrofit light fixture control applications is provided in Document LFSM. A detailed description of the SGPC hardware and power switching software as applied to retrofit wall-switch and wall-outlet control is provided in Document PMSM. These documents and their cited documents are included herein by reference.

General Advantages

A number of significant advantages are provided by the use of SGPC-based switching/sensor technologies, including but not limited to the following:

SGPC modules may be incorporated into retrofit lighting control modules that can be installed in conventional incandescent or fluorescent lighting fixtures to both control the power to the light bulb but also provide sensor monitoring at the light fixture location.

The SGPC modules can incorporate a wide variety of environmental sensors, including but not limited to motion, audio, image, video, smoke, carbon monoxide, temperature, radiation, etc.

The SGPC-driven security monitoring system permits instant access to both environmental sensor data as well as lighting control functions via the Internet, and thus eliminates the need for a large software development effort to monitor/control the meshed network of environmental sensors and lighting controls. Instant access using a wide variety of computing devices is provided via this infrastructure via the use of embedded web hosting within each SGPC controller.

Retrofit applications using the present invention in light fixture contexts do not require separate wiring infrastructure to support both lighting control and security monitoring. This is a critical advantage in security retrofits of large building structures (especially governmental structures) and existing city/urban environments in which retrofitting additional security cabling infrastructure would be cost prohibitive.

Autonomous action within each SGPC module permits security events to be both logged and relayed via the Internet to conventional web-based browsers operating on a wide range of computing devices.

Mesh networking of SGPC modules ensures that a path to the Internet can be maintained should one or more SGPC modules lose wireless connectivity to the Internet.

The system/method as described herein is primarily focused on retrofit "old work" applications for security monitoring/control but may just as easily be integrated into "new work" construction in which the application constraints are less rigid.

Counter Terrorism Applications

While the present invention may be applied in a wide variety of contexts, it is particularly suitable for application in widespread deployment of security monitoring/control systems where implementation cost, broad coverage, and ageing infrastructure are critical system constraints. This is particularly true in urban cities, government buildings, airports, and other security-sensitive areas in which security monitoring is desirable, but for cost reasons has not been as extensively deployed as needed.

The present invention having several embodiments specifically directed to retrofit lighting control/sensor applications is well suited for deployment in just the types of environments where a traditional security monitoring system would be cost prohibitive. Additionally, the modular nature of the system as taught herein permits a wide variety of sensor types to be deployed in a cost efficient manner. For example, deployment of radiation sensors within a large city or within an urban mass transportation system is entirely possible using the present invention teachings by simply replacing a light bulb or a simple retrofit of an existing fluorescent lighting fixture.

Energy Conservation

In addition to the ability to rapidly deploy environmental sensors to support counter terrorism efforts, the present invention provides lighting control functions within the same monitoring/control context and as such can be used to modulate the operation of lighting fixtures in response to both environmental and overall energy monitoring functions. This permits, for example, the following capabilities:
   The ability to reduce lighting in areas not deemed a security risk when electric power is in short supply.
   The ability to trigger lighting in some areas only when movement in the area is detected, and to control the dwell time in which the lighting remains active.
   The ability to trigger lighting in zones within a geographic area based on motion detection by one SGPC within the area. This can permit, for example, lighting to be activated at the edge of a security area when the SGPC detects motion at the edge of the area.
   The ability to sense motion using infrared sensors and trigger lighting based on this detected movement.
   The ability to modulate lighting to a minimal level when no motion is detected in a given security zone, and then to increase the lighting if motion is detected.
   The ability to permit emergency responders to activate/deactivate lighting in particular areas of concern without involving a detailed analysis of the electrical infrastructure within the particular area.
   The ability to detect power consumption for a given lighting fixture and determine if the lighting device installed therein is malfunctioning or burned out. This permits rapid correction of security lighting failures or activation of security events in situations where lighting devices are intentionally damaged by vandals or other criminals.

One skilled in the art will recognize that the combination of counter-terrorism and environmental energy savings when deployed for example in all street lights within a city could provide a significant savings in overall energy consumption and would be especially advantageous in situations where electrical grid power was in short supply during peak loading times and could be reduced in an intelligent manner with selective reduction in street lighting.

BRIEF DESCRIPTION OF THE DRAWINGS

For a fuller understanding of the advantages provided by the invention, reference should be made to the following detailed description together with the accompanying drawings wherein:

FIG. 23 illustrates a perspective view of an exemplary G13 fluorescent receptacle retrofit modification incorporating environmental motion sensors;

FIG. 25 illustrates an exemplary prior art T12 fluorescent lighting schematic;

FIG. 26 illustrates an exemplary prior art T8 fluorescent lighting schematic used in a retrofit T12-to-T8 application;

DESCRIPTION OF PRESENTLY PREFERRED EXEMPLARY EMBODIMENTS

Figure 1:
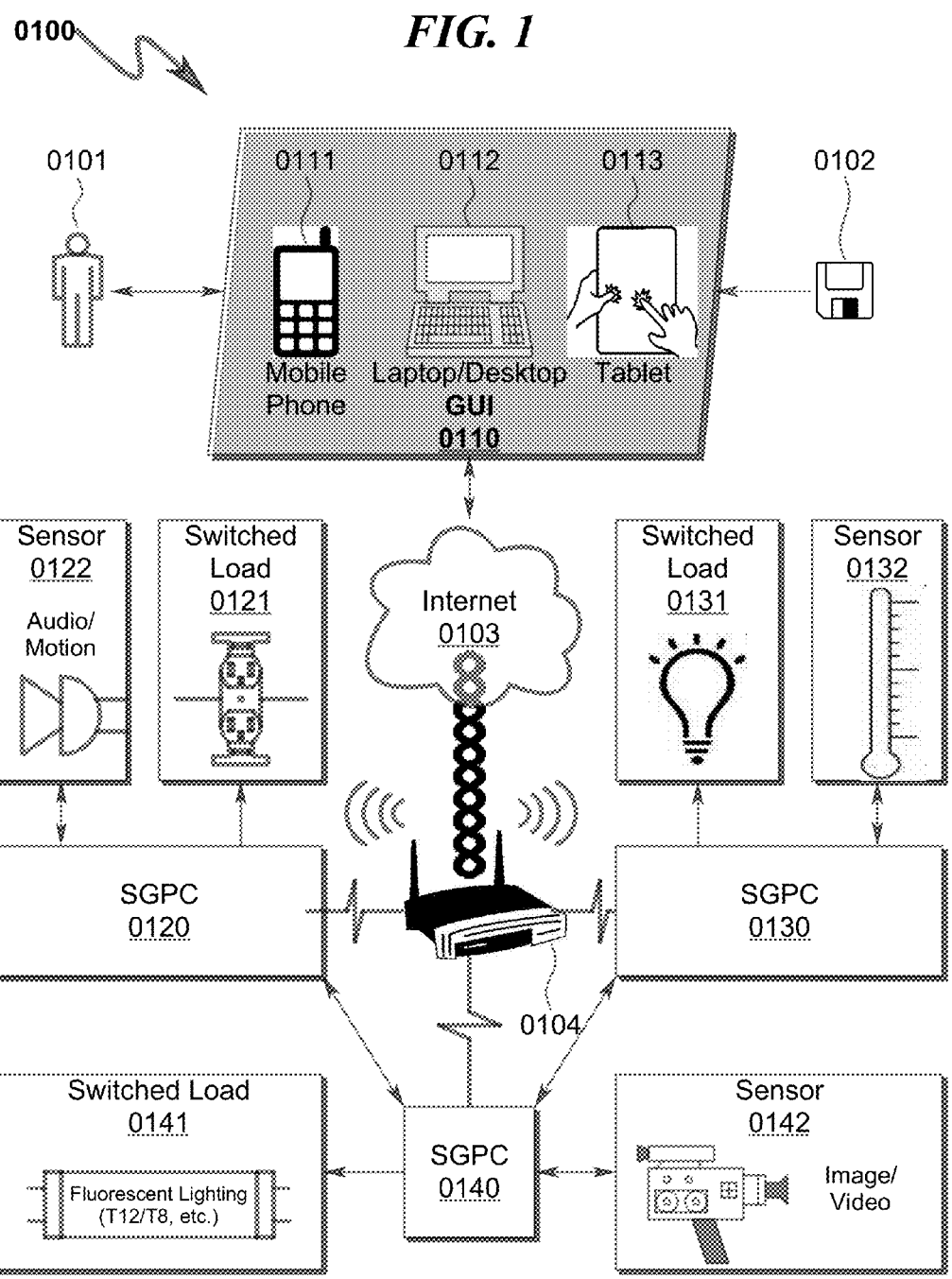
FIG. 1 illustrates a system block overview diagram describing a presently preferred embodiment of the present invention.
Figure 2:
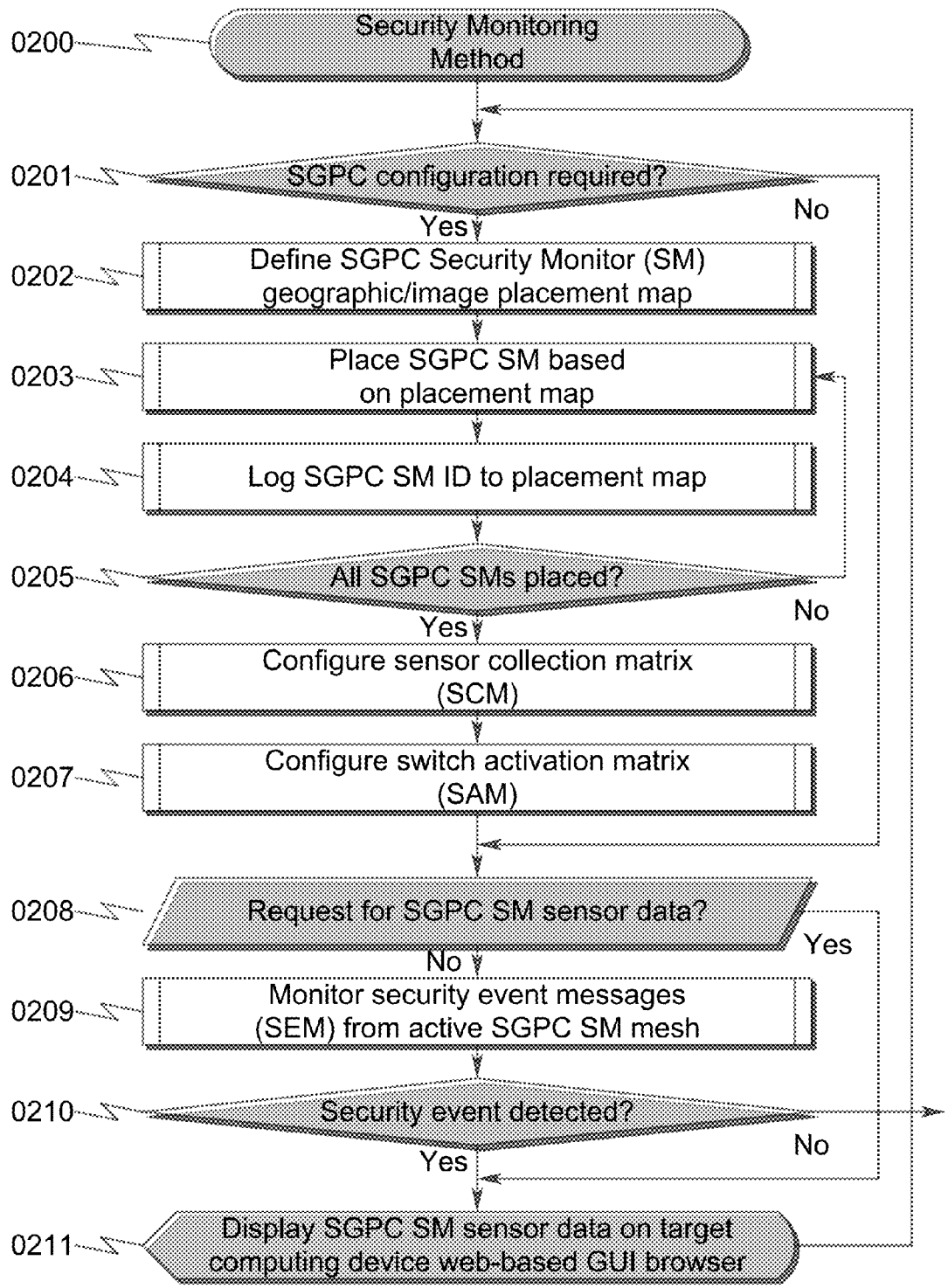
FIG. 2 illustrates a exemplary communications network diagram describing a presently preferred system embodiment of the present invention.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a SECURITY MONITORING SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Integration Level Exemplary

The present invention as depicted herein is exemplary of one or more preferred embodiments, but the level of integration illustrated is only exemplary and in no way limits the packaging or deployment of the disclosed invention teachings.

Enclosure/Faceplate not Limitive

The present invention anticipates a wide variety of enclosures and/or faceplates may be utilized in various invention embodiments. Many of these will comply with general guidelines from industry specifications such as ANSI/NEMA WD 6-2002 or the like which specify electrical enclosures associated with wall switches, electrical outlets, and the like. The present invention will describe these associated enclosures as having a generally "rectangular cuboid" shape. Note, however, this definition is generally less restrictive than that of the mathematical definition because it assumes that in many circumstances the faces of the rectangle may not meet at exactly right angles (to permit a "draft" when creating the box using an injected molding process). Furthermore, "rectangular cuboid" in this context will normally mean a 5-sided structure having one open face to accommodate a faceplate supporting a switch, sensor, electrical outlet, or blank face. These structures will also typically incorporate rear and/or sidewall knockouts or other structures designed to accommodate cable management/restraint/strain-relief for incoming/exiting wiring harnesses.

In geometry, a cuboid is a convex polyhedron bounded by six quadrilateral faces, whose polyhedral graph is the same as that of a cube. While some mathematical literature refers to any such polyhedron as a cuboid, other sources use "cuboid" to refer to a shape of this type in which each of the faces is a rectangle (and so each pair of adjacent faces meets in a right angle); this more restrictive type of cuboid is also known as a rectangular cuboid, right cuboid, rectangular box, rectangular hexahedron, right rectangular prism, or rectangular parallelepiped.

New Work/Old Word Electrical Boxes not Limitive

The present invention specifically anticipates that some SGPC embodiments are configured to be installed within standard electrical boxes used in building construction. These electrical boxes may take many forms, including but not limited to "new work" and "old work" styles. Within the construction trades, it is common to refer to electrical boxes configured for original/new construction as "new work" boxes as they are configured to be installed BEFORE wall/gypsum board is installed over the structural lumber and 2×4s. In contrast, "old work" electrical boxes are configured to be installed AFTER wall/gypsum board is installed over the structural lumber and 2×4s.

Electrical Box Construction not Limitive

The present invention in some embodiments may illustrate typical electrical boxes in some applications as provided by manufacturers such as CARLON®, RACO®, SLATER®, PASS & SEYMOUR®, etc. the present invention is not limited in scope to application with these particular manufacturers or construction configurations.

Motion Sensor not Limitive

In some preferred invention embodiments a motion sensor may be incorporated within the context of the present invention application. The present invention anticipates that infrared motion sensors may be optimal in this context, but is not necessarily limited to this particular selection. In some contexts, "motion" may be detected using video cameras, audio detection, temperature detection, or other methodologies. In addition, the motion detection function in this context may be passive (using only a receiving sensor) or may be implemented in combination with an active transmitter (as in the case of an infrared detector used in combination with an infrared illumination source or an ultrasonic detector used in conjunction with an ultrasonic emitter). Thus, the present invention makes no limitation on the scope of motion detection within this application context. Note that the use of infrared sensors in this context may permit the motion detection system to detect ambient room temperature (static background readings) as well as motion (dynamic activity readings).

The use of audio and/or video sensors in this application context may in some preferred embodiments permit live streaming audio and/or video to be sent to a remote host using the mesh network of SGPCs as a communication transportation conduit. This capability in conjunction with the ability for temperature sensing by the motion detector may in some applications be advantageously applied to whole-building surveillance/security/fire monitoring systems.

Power Receptacle not Limitive

Some application contexts of the present invention may incorporate a power receptacle suitable for use with a standard National Electrical Manufacturers Association (NEMA) (typically two or three-prong) line power cord. The present invention makes no limitation on the type of power receptacle used within the invention scope and anticipates that any NEMA compliant power receptacle may be used in this application context. Note that some application contexts may be directly wired into a building or equipment infrastructure and may dispense with any power receptacle.

Lamp Socket/Lamp Style not Limitive

Some application contexts of the present invention may incorporate a lamp socket (male and/or female) suitable for use with standard screw-in type lamps such as those having a outlines conforming to dimensions and tolerances for screw bases based on standard such as ANSI standard C81.67 and IEC standard 60061-1. Generally speaking, the presentation of standard E5, E10, E11, E12, E14, E17, E26, E26d, E27, E27d, E29, E39, E39d, and E40 light bulb sockets in the invention discussion is not limitive of the present invention and the choice of specific light bulb socket (and corresponding light bulb) will be application specific in many circumstances and extend beyond these specifically anticipated mechanical interfaces.

Similarly, the present invention anticipates that a wide variety of electrical connectors may be used to support fluorescent lighting fixtures. While G13 style electrical connectors are common in this application (as evidenced by T8/T12 connectors such as Leviton models 23351, 23651, 13351, 13357U, and 13652), other electrical connectors such as G5, G10q, and WP4.5x8.5d may also be used in some applications. The choice of fluorescent light fixture is independent of the lamp style used as the present invention anticipates that T2, T4, T5, T8, T9, T10, T12, T16, T17, PG17, T26, T29, and T38 may be used in various application contexts with the present invention.

Power Switch not Limitive

Some application contexts of the present invention may incorporate a power switch compliant with standard National Electrical Manufacturers Association (NEMA) (typically SPST or DPDT) specifications. The present invention makes no limitation on the type of power switch used within the invention scope and anticipates that any NEMA compliant power switch may be used in this application context. In some contexts the traditional NEMA-style ON/OFF toggle switch may be replaced by a pushbutton. Note that some application contexts may be directly wired into a building or equipment infrastructure and may dispense with any power switch and/or may be configured to operate in a different context with respect to the switch presented at the wall switch faceplate.

Computing Device not Limitive

The present invention may make use of a wide variety of computing devices in its general theme of construction. While microcontroller unit (MCU) construction may be optimal in many circumstances, the present invention is not limited to this particular form of construction and the term "computing device", "integrated computing device", "ICD", and "MCU" should be given their broadest possible definitions in this context.

Within many preferred invention embodiments a preferred MCU may be selected from System-On-Chip Integrated Circuits (SOC ICs) such as those sourced by Gainspan Corporation, 3590 N. First Street, Suite 300, San Jose, Calif. 95134, (408) 627-6500, such as exemplary models GS2000/GS1011SoC. Additionally, wireless modules integrating WiFi and/or ZIGBEE® communications capabilities are also anticipates as being suitable for many preferred invention embodiments, including but not limited to modules GS2011M, GS2100M, GS1011M, GS1011MIC, GS1011MIPS, GS1011MEPS/MEEES, GS1500M, and GS1550M.

Within many preferred invention embodiments a preferred MCU may be selected from System-On-Chip Integrated Circuits (SOC ICs) such as those sourced by Texas Instruments Incorporated, Post Office Box 655303, Dallas, Tex. 75265, such as exemplary models CC2530/CC2531.

Portable Computing Device not Limitive

The present invention anticipates a wide variety of applications for the security monitoring system/method taught herein. Within the application context, the term "portable computing device" and its variants should be given its broadest possible interpretation, to include but not bet limited to laptop computers, cellphones, tablet computers, and other like and typical applications where computing devices are configured in a portable or semi-portable manner. While the present invention anticipates that the computational capability of the "computing device" described herein may vary widely, it is anticipated that some aspects of the present invention may be implemented using software embodied in computer readable program code means embodied on a tangible medium that is computer readable.

System Overview (0100)

The present invention in various embodiments addresses one or more of the above objectives in the following manner. The present invention as generally depicted in FIG. 1 (0100) allows a user to communicate via a graphical user interface (GUI) (0110) implemented on a computing device (0111, 0112, 0113, 0114) executing software read from a computer readable medium (0102). This GUI (0110) communicates over a computer network (typically the Internet) (0103) to a remote wireless router (0104) to one or more Smart Gateway Power Controllers (SGPC) (0120, 0130, 0140) that control electrical power to respective switched loads (0121, 0131, 0141) and support data collection from a variety of environmental sensors (0122, 0132, 0142). Within this context the SGPCs (0120, 0130, 0140) may communicate among each other to coordinate the control of the switched loads (0121, 0131, 0141) and data collection from the environmental sensors (0122, 0132, 0142). This coordination may include routing capabilities to ensure that a path to the computer network (0103) and the computing device GUI (0110) is maintained even if an individual SGPC (0120, 0130, 0140) is unable to communicate directly with the wireless router (0104).

Within this context a wide variety of environmental sensors (0122, 0132, 0142) are anticipated, including but not limited to sensors detecting motion, audio, video, temperature, smoke, carbon monoxide, etc. The combination of local processor control within the SGPCs (0120, 0130, 0140) and environmental sensor data collection (0122, 0132, 0142) permits distributed security monitoring to occur without the need for a dedicated wired infrastructure, even if the distances between the SGPCs (0120, 0130, 0140) and the wireless router (0104) exceed reliable link communication distances.

The SGPCs (0120, 0130, 0140) incorporate a power switch and power/energy meter that are interfaced to a microcontroller unit (MCU) or other computing device operating under control of software read from a computer readable medium as described in Document PCSM. The MCU interfaces with one or more WiFi wireless network interface modules which communicate to one or more computer networks that may include the Internet, local computer networks, and/or other networks such as ZIGBEE®, etc.

The SGPC load switching functionality may be used to advantage in switching lighting and other consumer loads and within the context of the present invention several embodiments are specifically anticipated that permit the SGPC to be constructed in a retrofit configuration to permit existing lighting systems and wall-based electrical outlets to be retrofitted using this technology. Document LFSM describes this functionality in terms of one form of retrofit lighting socket and Document PDSM describes how this may be accomplished in terms of retrofitting wall-based light switches and wall-based electrical outlets.

Method Overview (0200)

The present invention system may be utilized in the context of an overall security monitoring method, wherein the security monitoring system described previously is controlled by a method having the following steps:

(1) Determining if SGPC configuration is required, and if not, proceeding to step (8) (0201);
(2) Defining a SGPC Security Monitor (SM) geographic/image placement map using a graphical user interface (GUI) to permit an association between a deployed SM to a specific geographic location (0202);
(3) Physically placing/installing the SGPC SM based on the placement map (0203);
(4) Logging the unique identifier (ID) associated with the SM to a specific location in the placement map (0204);
(5) Determining if all SGPC SMs have been placed, and if not, proceeding to step (3) (0205);
(6) Configuring the sensor collection matrix (SCM) associated with the deployed SMs (0206);
(7) Configuring the switch activation matrix (SAM) associated with the deployed SMs (0207);
(8) Determining if any Internet requests for SGPC SM sensor data have been received, and if so, proceeding to step (11) (0208);
(9) Monitoring security event messages (SEM) from the active SGPC SM mesh (0209);
(10) Determining if any SEM events have occurred, and if not, proceeding to step (1) (0210); and
(11) Displaying SGPC SM sensor data within a GUI hosted on a target computing device and proceeding to step (1) (0211).

Integration of this and other preferred exemplary embodiment methods in conjunction with a variety of preferred exemplary embodiment systems described herein is anticipated by the overall scope of the present invention.

Retrofitting Security Monitoring/Control (0300)-(0400)

Figure 3:
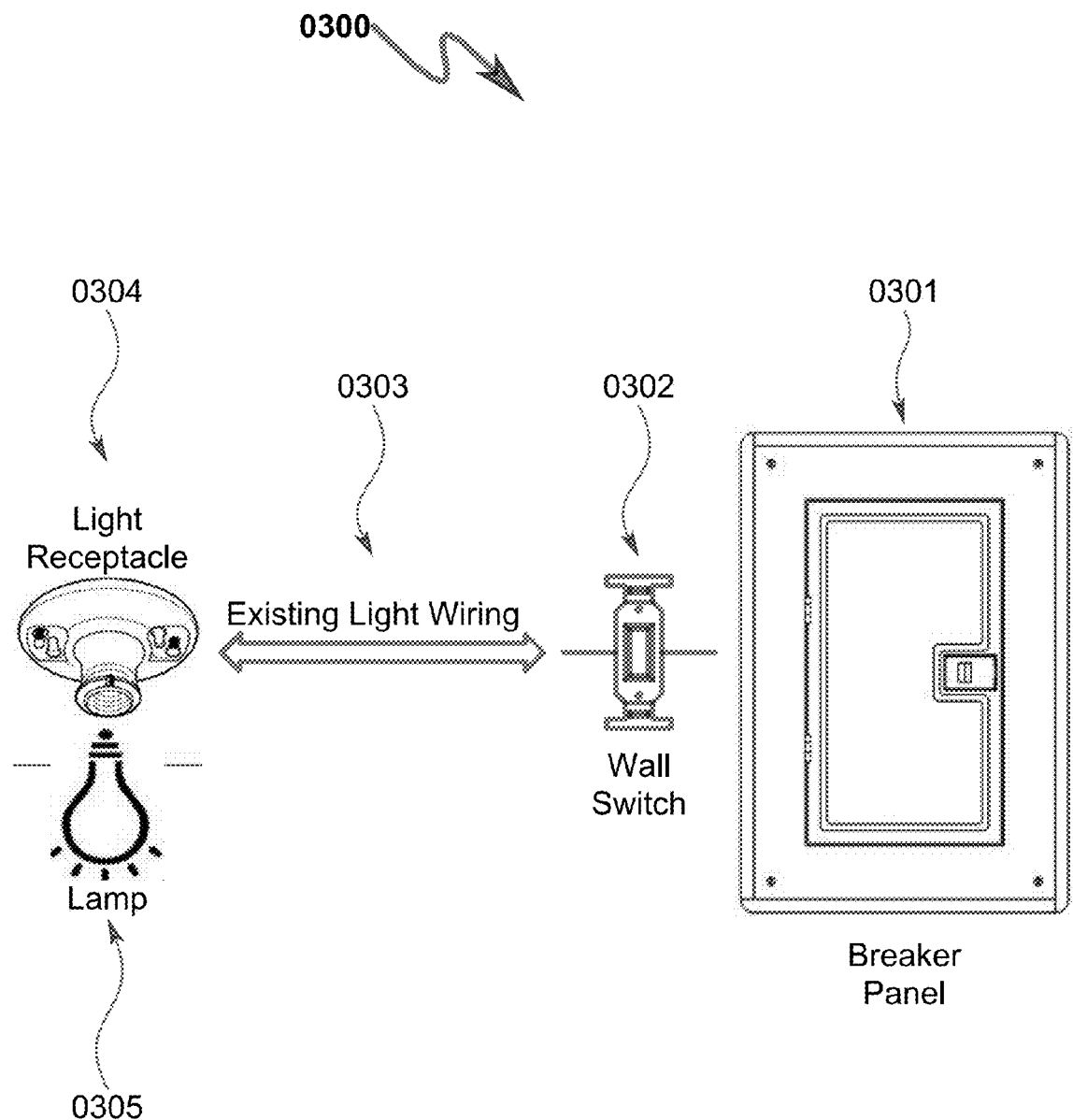
FIG. 3 illustrates a conventional lighting system schematic diagram that may be associated with a retrofit security monitoring/lighting control application.

An important application addressed by the present invention is the ability to retrofit existing lighting fixtures and systems with security monitoring/control capabilities. A typical retrofit application is depicted in FIG. 3 (0300) wherein a breaker panel (0301) supplies power to a wall switch (0302) that is connected to building wiring (0303) supplying power to a lamp receptacle (0304) into which a lamp is installed (0305). This application context should be considered abstracted in the sense that all the elements can be substituted for a wide variety of application contexts. For example, the breaker panel (0301) could be considered any power sourcing capability, the wall switch (0302) could be considered any power switching function (such as a streetlight power control), the wiring (0303) can be considered any method to distribute power to the lamp receptacle (0304); the lamp receptacle (0304) can be considered any lighting receptacle; the lamp (0305) can be considered any light producing element. Thus, while the diagram depicts traditional Edison style lighting, the diagram can be generalized to fluorescent lighting in a building context as well as external building illumination and street lighting.

Figure 4:
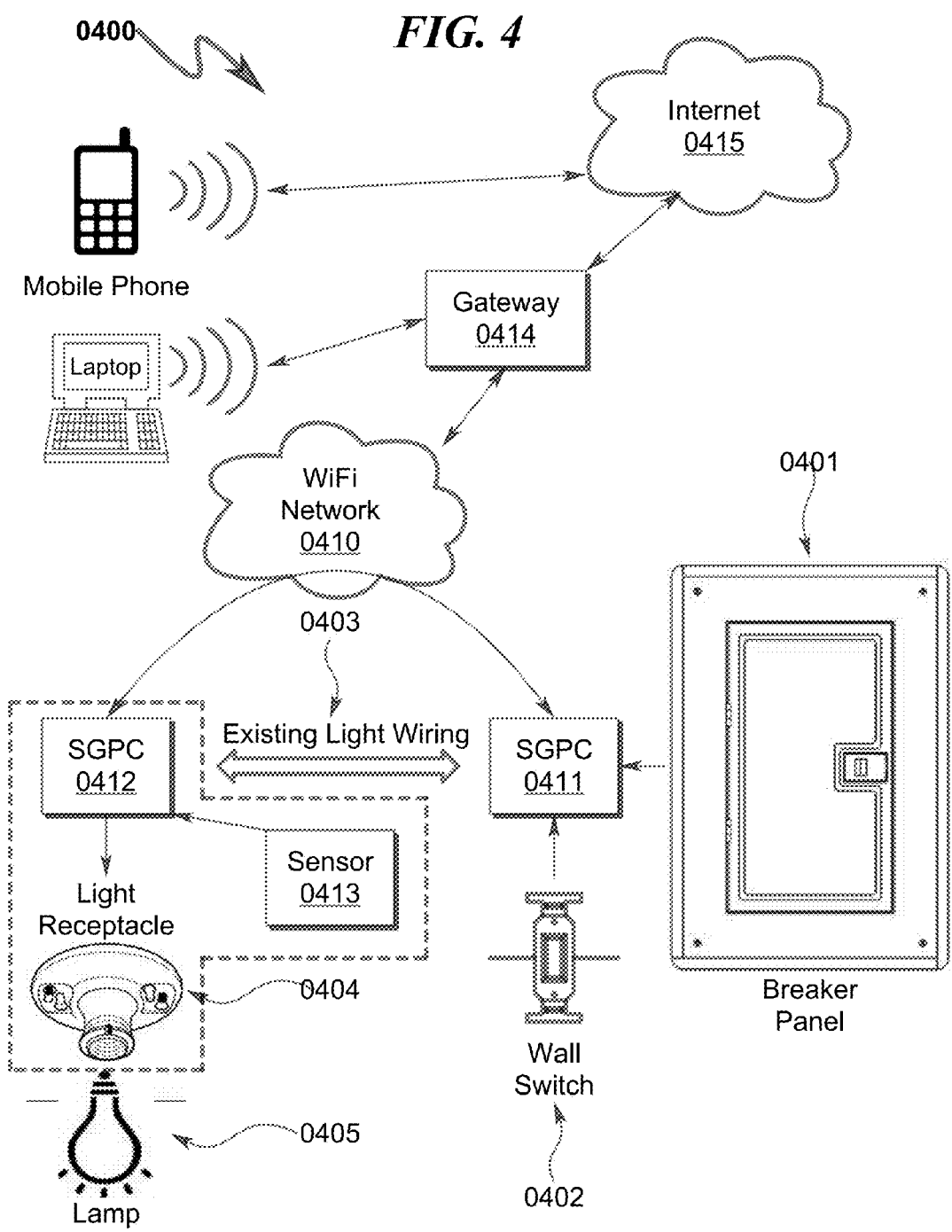
FIG. 4 illustrates an exemplary retrofit security monitoring system as applied to an existing lighting infrastructure.

FIG. 4 (0400) depicts a potential retrofit application using SGPC controllers for this generalized application context. Here the breaker panel (0401) sources power to a SGPC (0411) that takes status input from the wall switch (0402) to determine if power it to be sourced to the existing electrical light wiring (0403) and the attached remote SGPC (0412). The remote SGPC (0412) is directly responsible for providing power to the light receptacle (0404) and the installed lamp (0405). This scenario can differ from that depicted in FIG. 3 (0300) in several ways, including but not limited to the following:

The sourcing SGPC (0411) may be configured to normally supply power to the remote SGPC (0412) via the existing light wiring (0403), but utilize the wall switch (0402) to determine whether activation commands are sent to the remote SGPC (0412) via the WiFi network (0410) linking the two SGPCs (0411, 0412). This indirect control permits the existing light wiring (0403) to remain "HOT" and thus supply power to the remote SGPC (0412) to support environmental sensor (0413) data collection.

The sourcing SGPC (0411) need not necessarily be proximal to the remote SGPC (0412) for the control of the remote SGPC (0412) to be possible, as each SGPC in the WiFi network (0410) is capable of routing control/monitoring/sensor commands to any SGPC connected to the network. This permits low power wireless communication to occur within a routing "mesh" of SGPCs. This capability is especially important in providing security monitoring/control in spatially diverse environments such as city streets, government buildings, and the like.

Within this context it is also possible for the SGPCs (0411, 0412) to communicate to external devices through the WiFi network (0410) to a standard gateway (0414) via the Internet (0415) to any number of computing devices configured with a web browser to permit security monitoring functions to be performed with respect to the environmental sensor (0413). This transparent access to the SGPCs (0411, 0412) means that every SGPC is "Internet visible" and with proper access controls can be accessed anywhere and at any time via any Internet web browser enabled computing device.

It is of critical advantage that this system does NOT require modification of the existing light wiring (0403) infrastructure or the installation of additional wiring to support the lighting (0405) control function or support for data gathering from the environmental sensor (0413). This means from a practical deployment perspective that the remote SGPC (0412) installation can in many circumstance be accomplished by simply augmenting the light receptacle fixture (0404) with an adapter module incorporating the remote SGPC (0412). This ease of installation cannot be overstated given the breadth of installation scope required to completely retrofit an entire building security system or to deploy security monitoring in every streetlight in a large metropolitan area such as is found in cities such as Washington D.C., New York, Boston, Chicago, Dallas, Houston, San Francisco, or Los Angeles.

It can be seen from the above contrast to the prior art that the SGPC security monitoring system depicted in FIG. 4 (0400) represents a significant opportunity in deploying security monitoring capability on a large scale basis while eliminating the costs associated with traditional security system deployment.

Exemplary SGPC Wall Switch Integration (0500)-(0800)

As generally depicted in FIG. 4 (0400), the existing wall switch (0402) may be utilized in many retrofit applications to control the "soft" operation of the SGPC (0411) in controlling the remote SGPC (0412) to activate/deactivate power to the light fixture (0404) and attached lamp (0405). The following sections detail information presented in Document PDSM that describes how this functionality can be physically implemented in the context of a conventional electrical wall switch box.

Exemplary Pushbutton SGPC Wall Switch Embodiment (0500)-(0600)

Figure 5:
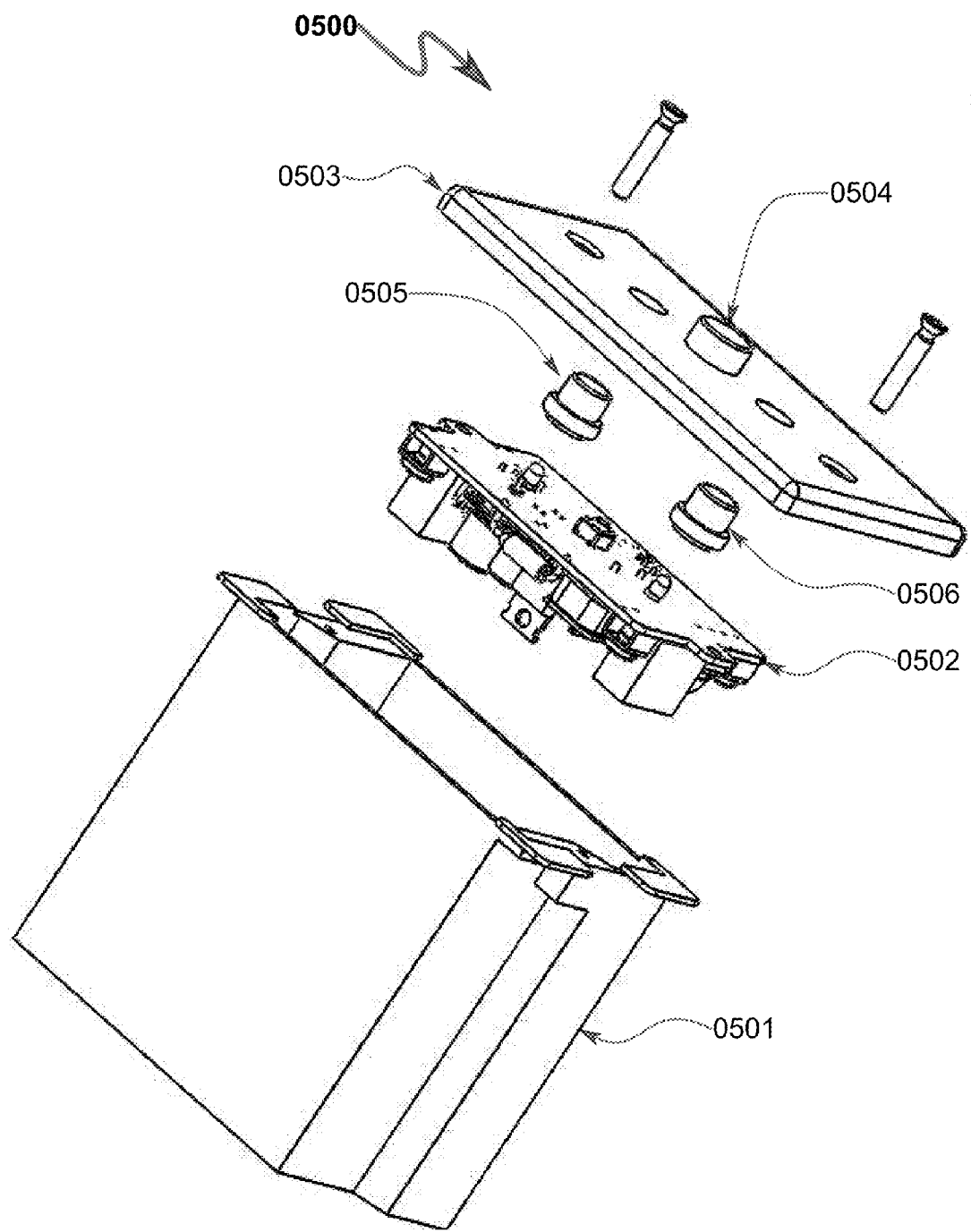
FIG. 5 illustrates a side perspective assembly view of a preferred exemplary pushbutton wall switch implementation of a SGPC power distribution system.
Figure 6:
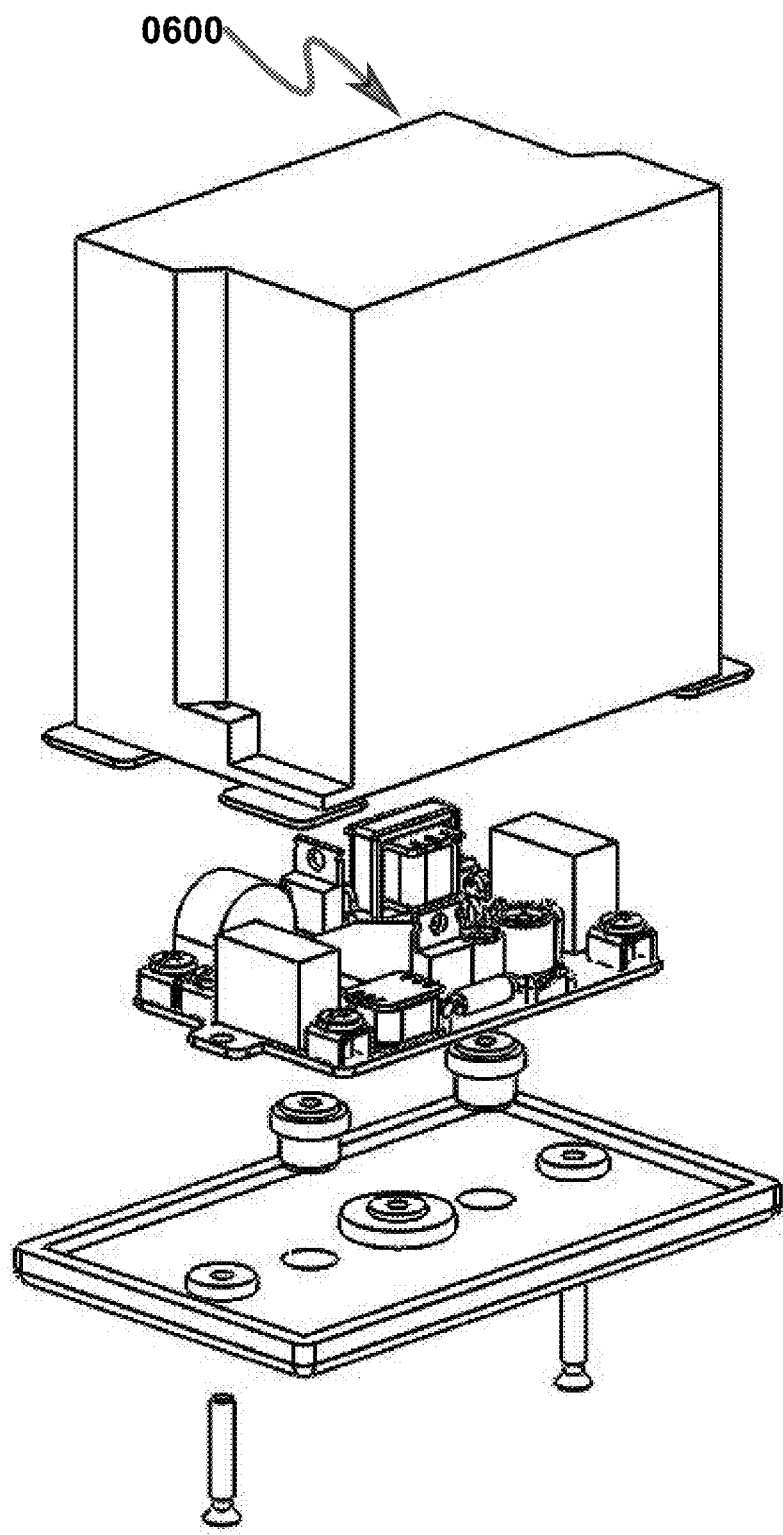
FIG. 6 illustrates a side perspective assembly view of a preferred exemplary pushbutton wall switch implementation of a SGPC power distribution system.

An exemplary SGPC power distribution system using a pushbutton wall switch is generally illustrated in FIG. 5 (0500)-FIG. 6 (0600), and illustrates an exemplary rectangular cuboid electrical box (0501) in which the SGPC module (0502) is placed. This particular embodiment illustrates the wall plate (0503) configured with a pushbutton (0504) and two LED indicators with translucent bezels (0505, 0506) to permit indication of the system state to the user. Other variations of this configuration may utilize sensors within the translucent bezels (0505, 0506) to perform a variety of localized sensor functions (motion, audio, video, etc.) as discussed herein. This local SGPC (0411) sensor functionality is in addition to the sensor (0414) logging that provided in the remote SGPC (0412).

Exemplary Toggle Switch SGPC Wall Switch Embodiment (0700)-(0800)

Figure 7:
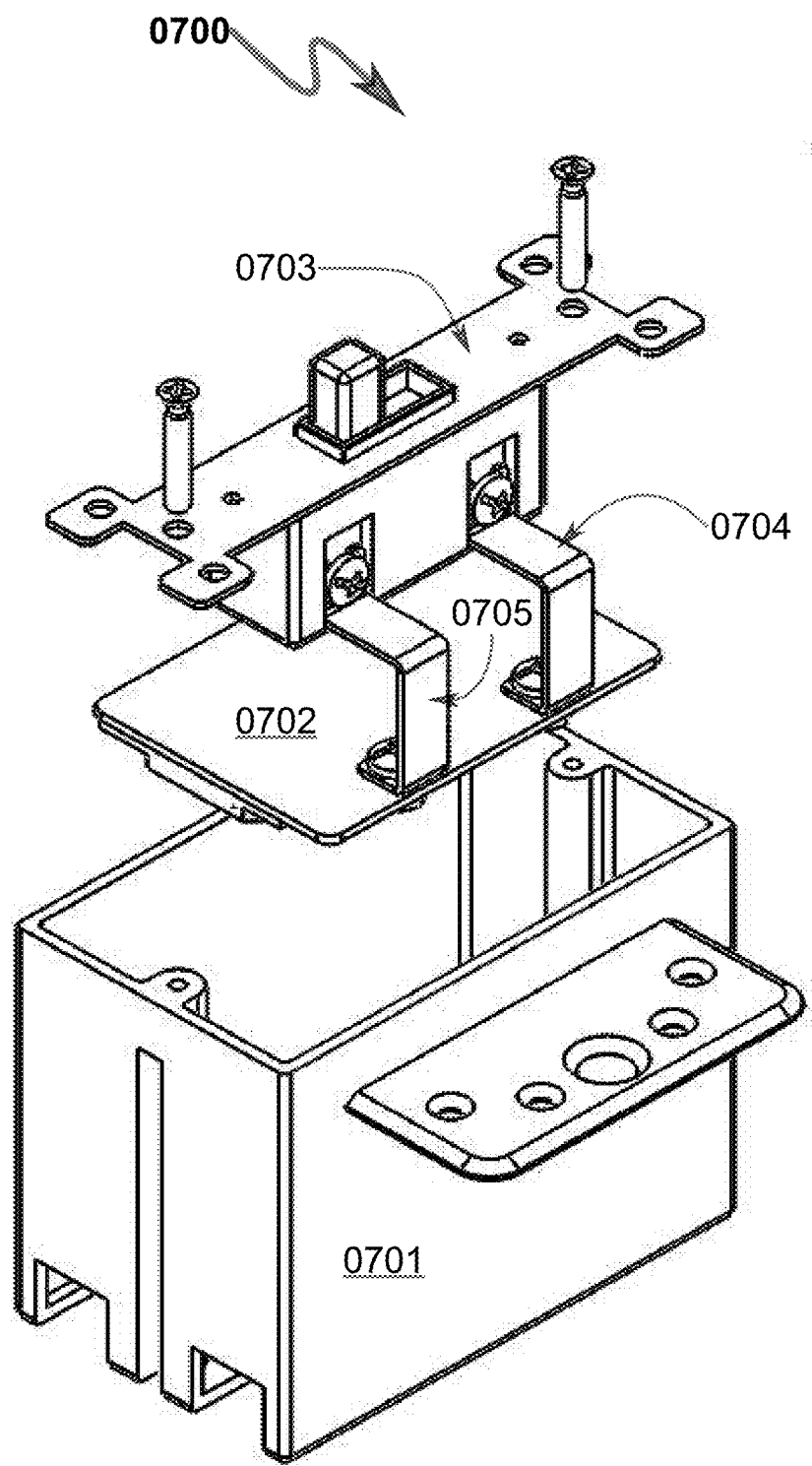
FIG. 7 illustrates a perspective view of a preferred exemplary SGPC PCB module implementation (that may be suitable for use in a toggle switch wall electrical box application.
Figure 8:
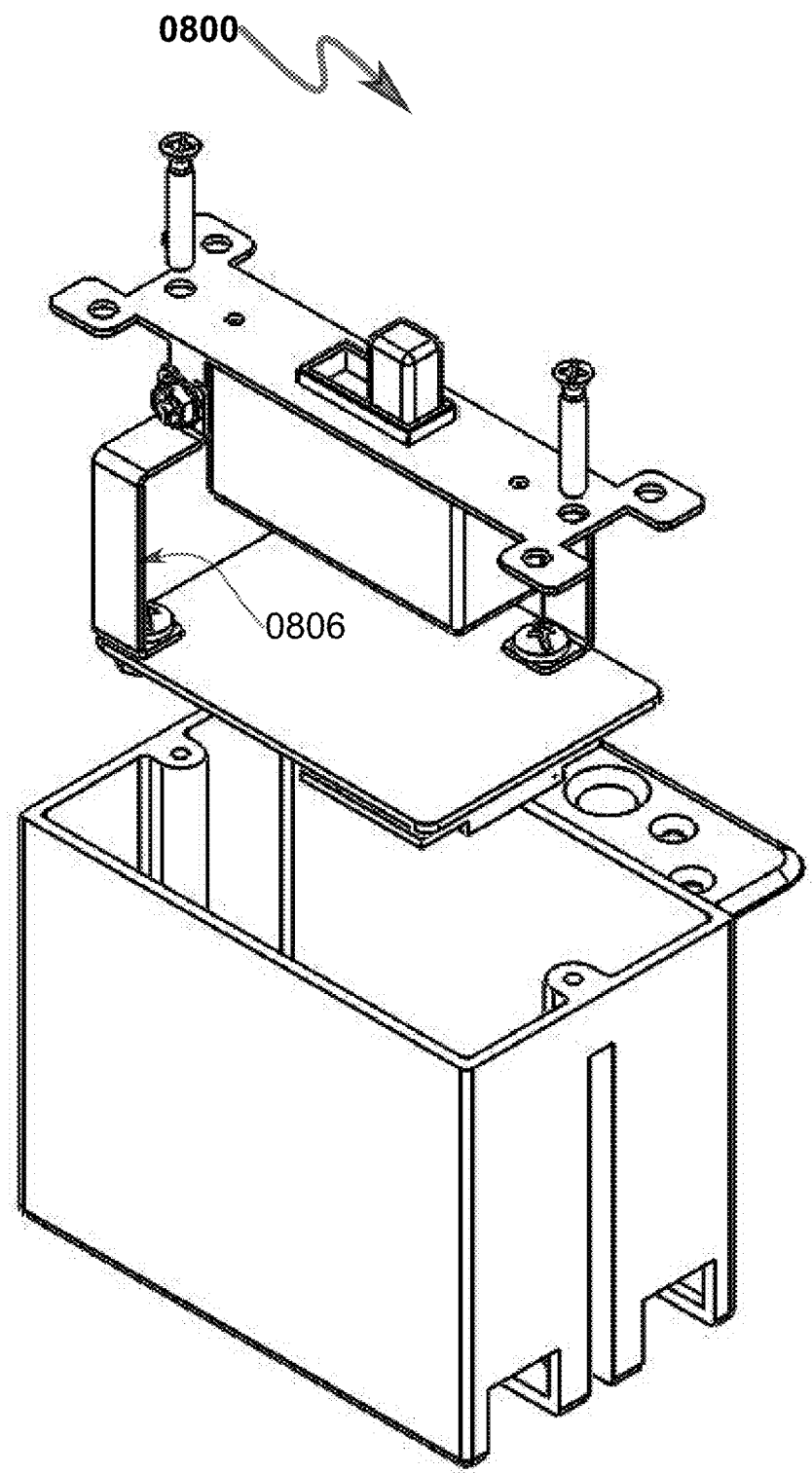
FIG. 8 illustrates a perspective view of a preferred exemplary SGPC PCB module implementation (that may be suitable for use in a toggle switch wall electrical box application.

An exemplary SGPC power distribution system using a conventional toggle wall switch is generally illustrated in FIG. 7 (0700)-FIG. 8 (0800), and illustrates an exemplary rectangular cuboid electrical box (0701) in which the SGPC PCB module (0702) is placed. This particular embodiment illustrates the toggle switch (0703) configured with mounting straps (0704, 0705, 0806) to permit support of the SGPC PCB within the electrical box cuboid enclosure. Note that this configuration permits the SGPC module (0702) to be populated on both sides of the PCB while being securely supported by the toggle switch (0703) within the electrical wall box enclosure (0701). The general illustrations provided in FIG. 7 (0700)-FIG. 8 (0800) do not include a populated SGPC PCB module, as the components have been omitted to clarify the mounting relationship between the PCB and the toggle switch. While traditional screw fasteners have been used to attach the SGPC PCB to the mounting straps (0704, 0705, 0806), one skilled in the art will recognize that these straps may be soldered, riveted, or otherwise fastened to the SGPC in a number of equivalent ways.

Exemplary Lighting Fixture Integration Overview (0900)-(1000)

The present invention describes a product that allows security monitoring in conjunction with integrated lighting control from an Internet-capable device (e.g., a smart phone, a tablet, or a laptop). The present invention also allows lighting control to function with other devices in the same sub-network. The present invention in some preferred embodiments embeds these control functions within the lighting fixture.

Figure 9:
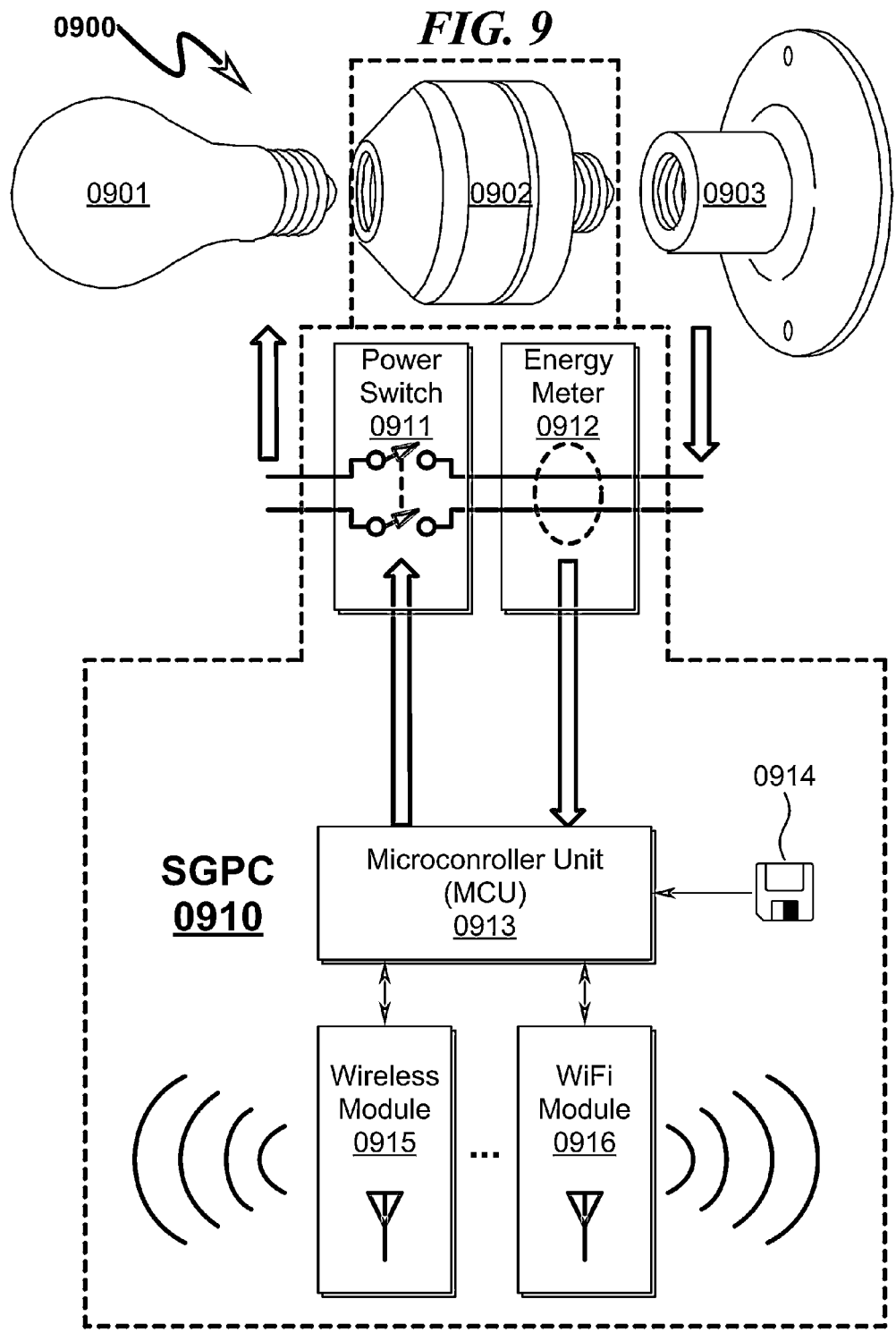
FIG. 9 illustrates a general overview system diagram describing a preferred exemplary invention system embodiment as implemented using SGPC control.

A general overview of the present invention as implemented in a typical retrofit security monitoring application is generally depicted in FIG. 9 (0900) wherein a lamp (0901) is inserted into a retrofit SGPC module (0902) and then screwed into a conventional lighting receptacle (0903). This configuration may be generalized to many other forms of lighting fixtures including a wide variety of fluorescent lighting. Within this context the retrofit SGPC module (0902) incorporates SGPC functionality as described in Document PCSM and depicted in this figure as the SGPC controller (0910) comprising a power switch (0911), energy meter (0912), MCU/ICD (0913) executing software read from a computer readable medium (0914), and one or more wireless communication modules (0915, 0916). While this diagram generally depicts the overall system blocks contained in the system, a more detailed depiction is provided in FIG. 10 (1000).

Figure 10:
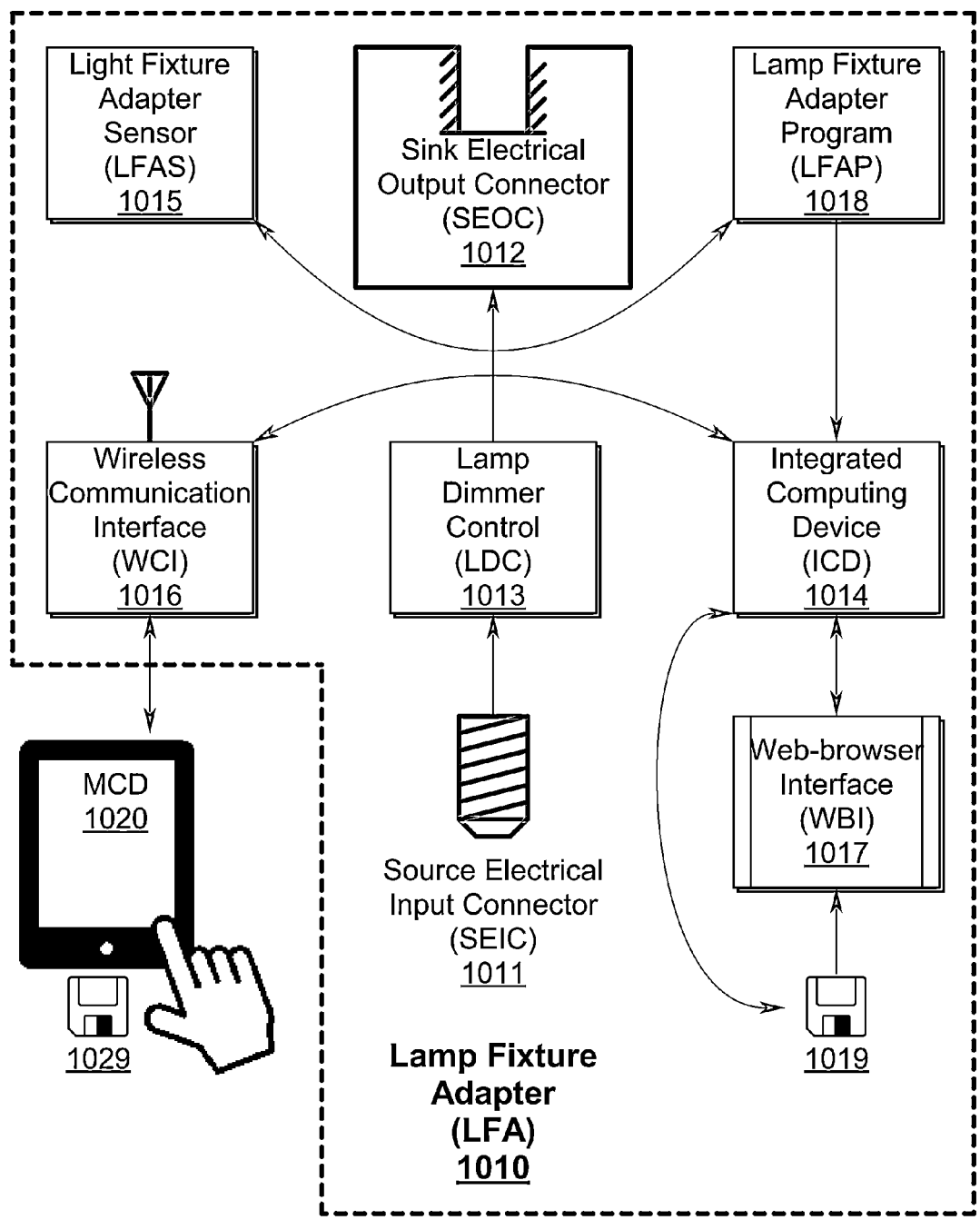
FIG. 10 illustrates a detailed overview system diagram describing a preferred exemplary invention system embodiment as implemented using SGPC control.

An overview of this integrated security monitoring system is depicted in FIG. 10 (1000) wherein the system comprises a light fixture adapter (LFA) comprising:
  (a) source electrical input connector (SEIC) (1011); and
  (b) sink electrical output connector (SEOC) (1012);
  (c) lamp dimmer control (LDC) (1013);
  (d) integrated computing device (ICD) (1014);
  (e) light fixture adapter sensor (LFAS) (1015); and
  (f) wireless communication interface (WCI) (1016);
  wherein
  said SEIC, said SEOC, said LDC, said ICD, said LFAS, and said WCI are contained within a cylindrical housing configured to be installed between an existing electrical lamp and an existing electrical lamp fixture;
  said LDC is configured to control the flow of electrical current from said SEIC to said SEOC under direction of said ICD;
  said ICD is configured to monitor said LFAS;

said ICD is configured to control said LDC in response to inputs from said LFAS;

said ICD is configured to monitor said WCI;

said ICD is configured to control said LDC in response to inputs from said WCI;

said ICD is configured with a web-browser interface permitting remote monitoring of said LFAS via said WCI and remote control of said LDC via said WCI;

said ICD is configured to execute instructions stored in a lamp fixture adapter program (LFAP);

said LFAP is configured to allow local control and monitoring of said LDC in response to inputs from said LFAS;

said LFAP is configured to allow local control and monitoring of said LFAS in response to inputs from said WCI;

said LFAP is configured to allow said LFAS to be monitored and controlled by said web-browser interface;

said LFAP is configured to allow reporting of LFAS detected events to said WCI;

said LFAP is configured to be remotely programmable via said WCI via said web-browser interface; and said ICD is configured to collect data from said LFAS based on configuration information defined by a web-browser interface hosted by said ICD and transmit said collected data to a remote computing device via said WCI thru a wireless router connected to the Internet.

Within this context the WBI and ICD may be configured to execute software read from a computer readable medium (1019). Furthermore, the system anticipates that mobile communication devices (MCD) (1020) running applications read from a computer readable medium (1029) may also be used as a remote control and/or web interface for the system.

Method Overview (1100)

Figure 11:
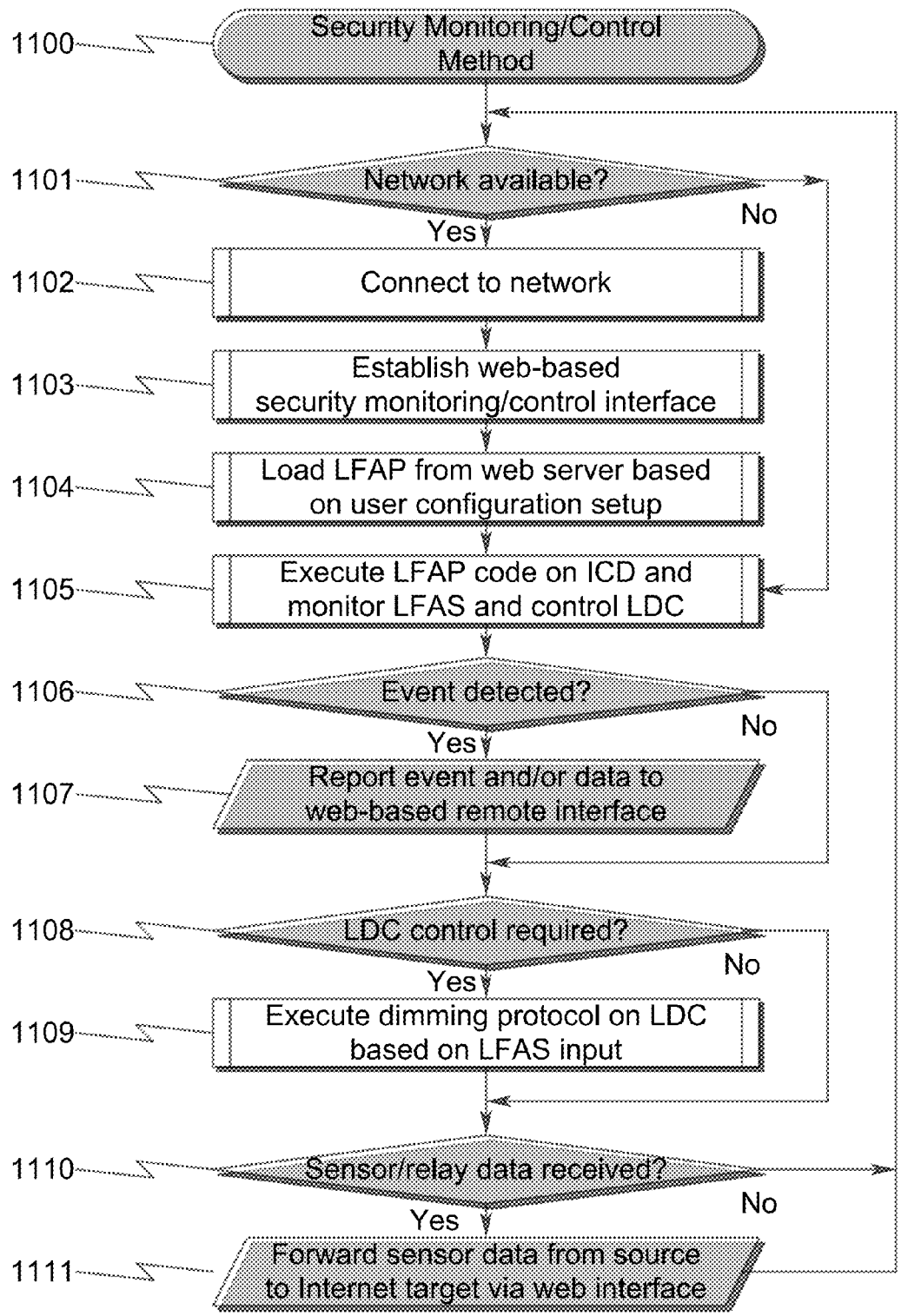
FIG. 11 illustrates a flowchart describing a preferred exemplary invention security monitoring/control method.

As depicted by the flowchart in FIG. 11 (1100), the present invention system may be utilized in the context of an overall light fixture monitoring/control method, wherein the light fixture monitoring/control system described previously is controlled by a method having the following steps:

(1) Determining if the computer network is available, and if not, proceeding to step (5) (1101);

(2) Connecting to the computer network (1102);

(3) Establishing a web-based Internet security monitoring and control interface (1103);

(4) Loading the LFAP from the web-server based on a user configuration setup (1104);

(5) Executing LFAP instructions on the ICD to monitor the LFAS and control the LDC (1105);

(6) Determining if a LFAS event has occurred and if not, proceeding to step (8) (1106);

(7) Reporting the event and/or sending data to a web-based remote interface (1107);

(8) Determining if LDC control is required by a local or remote control instruction, and if not, proceeding to step (1) (1108);

(9) Executing a dimming instruction protocol on the LDC based on LFAS input (1109);

(10) Determining if LFAS data or relayed data from another LFA has been received, and if not, proceeding to step (1) (1110); and

(11) Forwarding LFAS data to a target data recipient over the Internet and proceeding to step (1) (1111).

Integration of this and other preferred exemplary embodiment methods in conjunction with a variety of preferred exemplary embodiment systems described herein is anticipated by the overall scope of the present invention.

Description of a Plug & Play Dimmer (1200)

Figure 12:
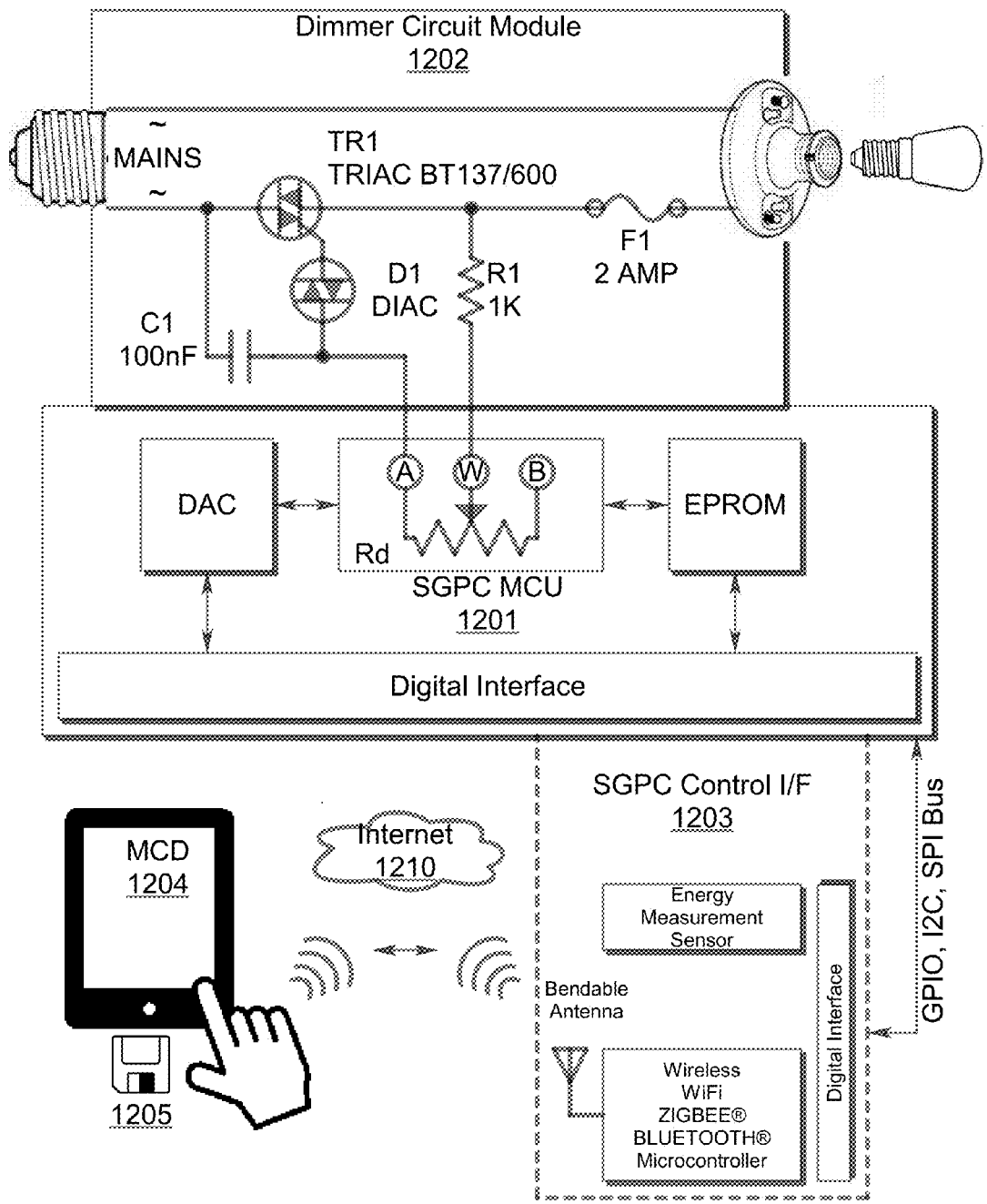
FIG. 12 illustrates an electrical system overview of a presently preferred invention system embodiment.

One preferred invention embodiment implements a dimmer control circuit in conjunction with the lighting control system. A detail of this particular system variant is depicted in FIG. 12 (1200) and comprises the following parts:

TRIAC/DIAC circuit;

digital potentiometer that generally replaces a mechanical trim potentiometer;

Wireless transceiver and MCU (WiFi or ZIGBEE®);

Sensors;

Energy monitoring unit; and

Flexible antenna unit.

TRIAC/DIAC control circuit is implemented with a digital potentiometer to achieve variable amount of power delivered to the light bulb or ceiling fan. In this case, the variable resistor Rd in the digital potentiometer performs the function of a mechanical resistor by replacing the mechanics with a simple 2-wire digital interface such as I2C bus or SPI, etc.

In the TRIAC-DIAC circuit in FIG. 12 (1200) it is similar to that used in conventional dimmers except with for the use of a digital potentiometer. The AC mains waveform is phase shifted by the circuit with capacitor C1 and variable Rd so that a reduced amplitude, phase delayed version of the mains waveform appears across capacitor, C1. As this wave reaches the break over voltage of the DIAC, it conducts and discharges capacitor C1 into the gate of the TRIAC, so triggering the TRIAC into conduction. The TRIAC then conducts for the remainder of the mains half cycle, and when the mains voltage passes through zero it turns off. While into the next half cycle, the voltage on C1 reaches break over voltage in the other polarity and the DIAC again conducts, providing an appropriate trigger pulse to turn on the TRIAC. By varying Rd, the amount of phase delay of the waveform across capacitor C1 can be varied, allowing the time during each half cycle at which the TRIAC fires to be controlled. In this way, the amount of power delivered to the load such as lights or fans can be varied, and the function of dimming is implemented.

A wireless RF transceiver/MCU (1220) may be used to adjust the lighting brightness by communication over the Internet (1210). The dimming operations may also be based on some type of "local" sensors connected to the MCU. For example, the ambient motion sensor may increase or decrease the brightness of the light based on people walking towards or away from the light. The light sensor may increase or decrease the brightness of light based on the ambient light.

How sensors trigger the dimming operations are set by the remote control and recorded in the dimmer MCU. For example, when a light sensor detects the ambient light exceeding certain brightness, it would decrease the light brightness to a certain percentage. When a motion sensor detects people in the room, it would increase the light brightness to a certain percentage. This type of configuration is infinite. The mobile computing device (1229) may provide a user interface for users to configure the operation of the dimmer control.

The dimming commands is converted by MCU into $I^2C$ or SPI protocol and then sent to the series interface of digital potentiometer via $I^2C$ or SPI bus. Digital potentiometer converts the commands from the digital bit stream into the analog signal. The value of variable resistor Rd will be adjusted proportionally to the amplitude of analog signal.

The MCU reports the dimmer status—the light brightness in terms of percentage and the events when a local sensor triggers a dimming action—to the MCD (1220), either event-driven or at the request of the remote control.

The dimmer essentially has two components:
the current regulating component comprising of TRIAC/DIAC circuit and digital potentiometer; and
the control component comprising of the energy measurement unit, wireless module (WiFi or ZIGBEE®) & MCU, sensors and flexible antenna unit.

The following highlight the innovative aspects of the dimmer:

The present invention may incorporate an energy monitoring unit that reads the power measurement and interacts with a user through the wireless module.

To enable operation within the small housing space of the dimmer, the present invention makes use of an antenna that can be bent and installed around the wall of the circular housing. This flexible antenna is printed on a bendable board to enhance the wireless RF signal strength. It is connected to Wireless, WiFi, or ZIGBEE® Transceiver module via a standard cable assembly. The antenna is connected with the control component via standard RF connector.

The control component may be configured as a removable piece from the dimmer. The control module has a standard interface (pin connector) with the current regulating component. The standard interface allows different control modules to be configured to operate with the dimmer control circuitry.

Light Bulb Retrofit with Environmental Sensors (1300)-(1600)

Figure 13:
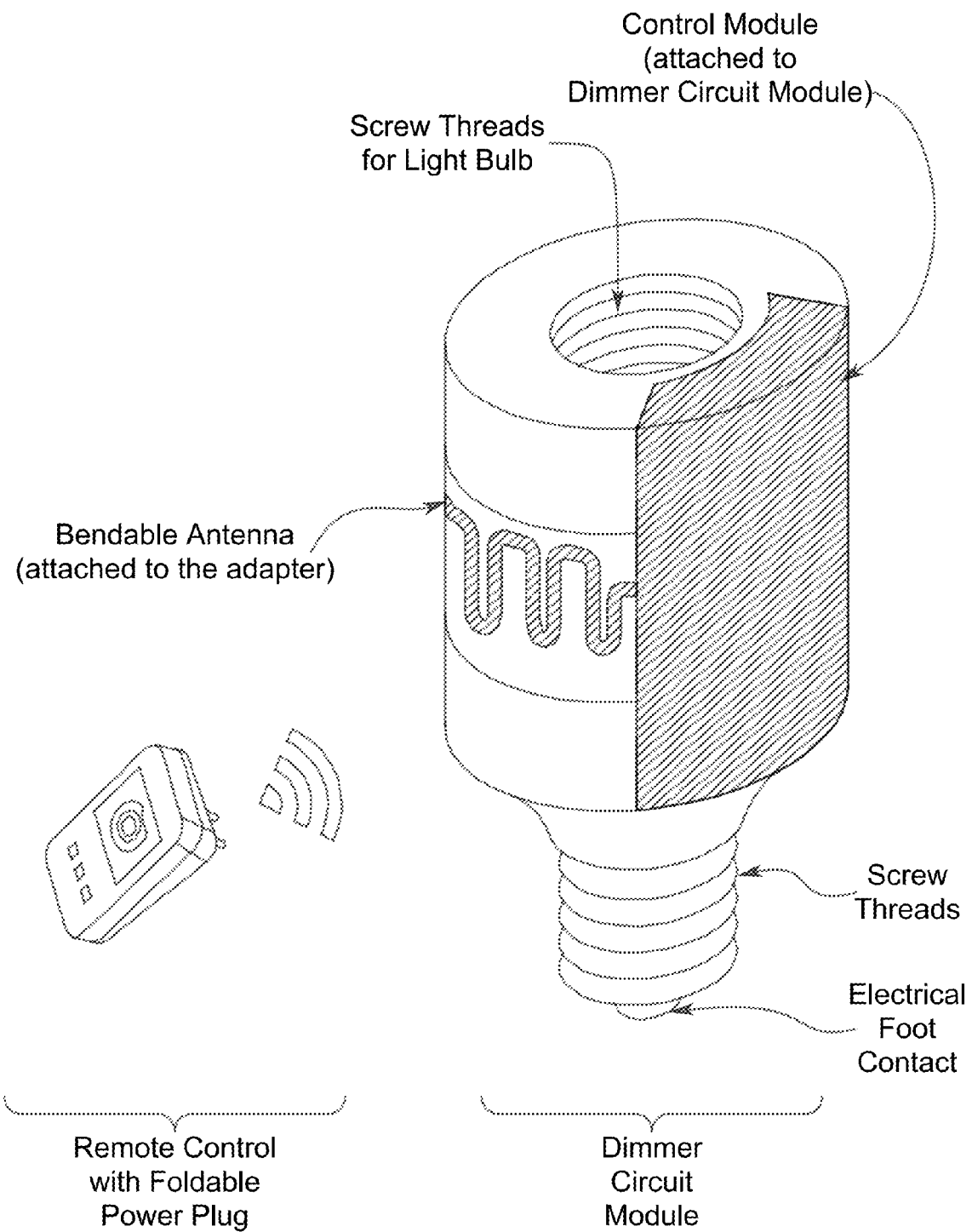
FIG. 13 illustrates an exemplary retrofit SGPC security monitoring system adapted for use with standard screw-base lamps.
Figure 14:
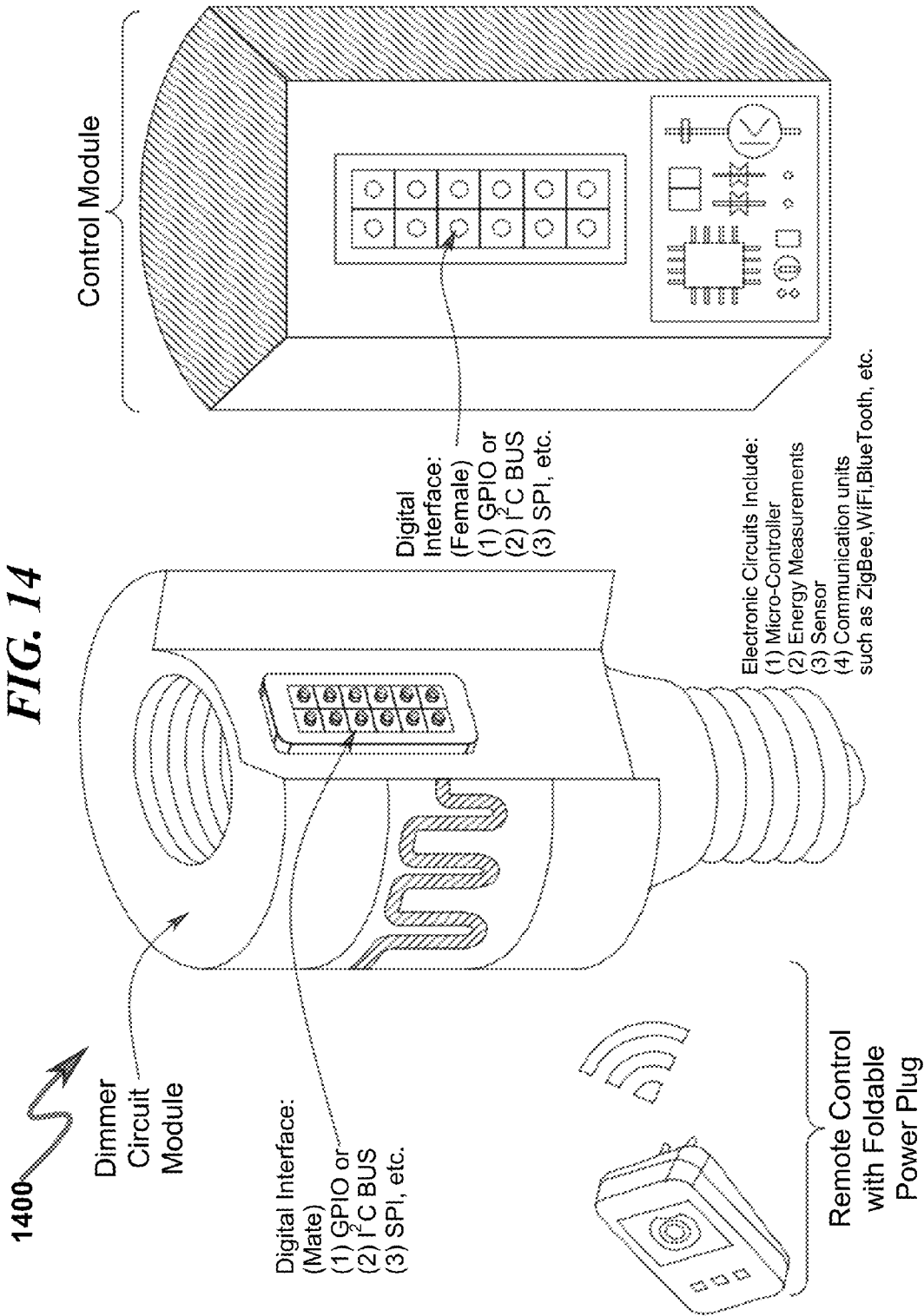
FIG. 14 illustrates an exemplary retrofit SGPC security monitoring system adapted for use with standard screw-base lamps.
Figure 16:
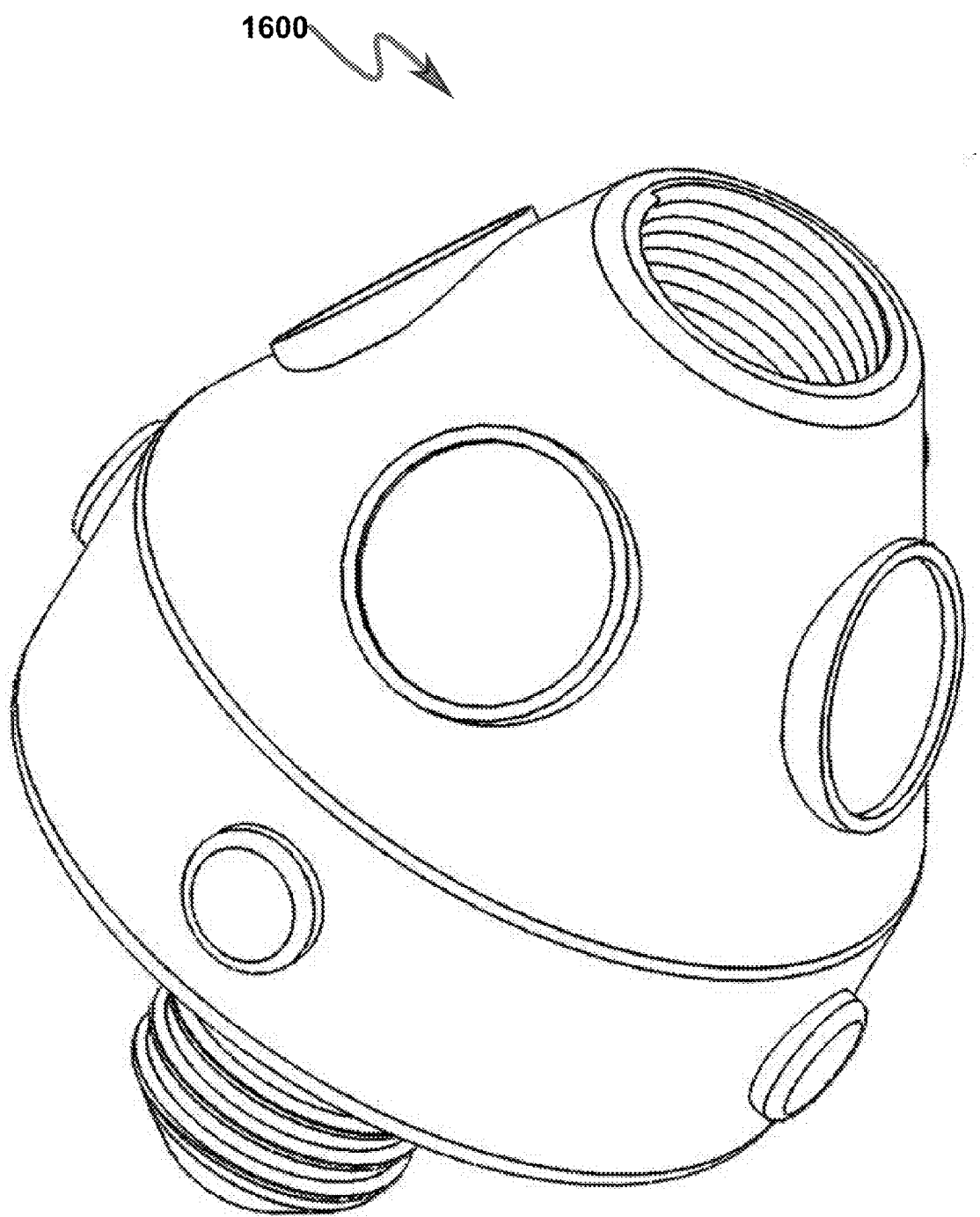
FIG. 16 illustrates an alternate exemplary retrofit SGPC security monitoring system adapted for use with standard screw-base lamps.

As generally illustrated in FIG. 13 (1300)-FIG. 16 (1600), the present invention may be adapted to support a wide variety of retrofit configurations for standard lighting fixtures that utilize conventional Edison-style screw-in bulbs. These configurations as with others described herein incorporate SGPC control functionality as well as environmental sensors that may include imaging and video monitoring.

Figure 15:
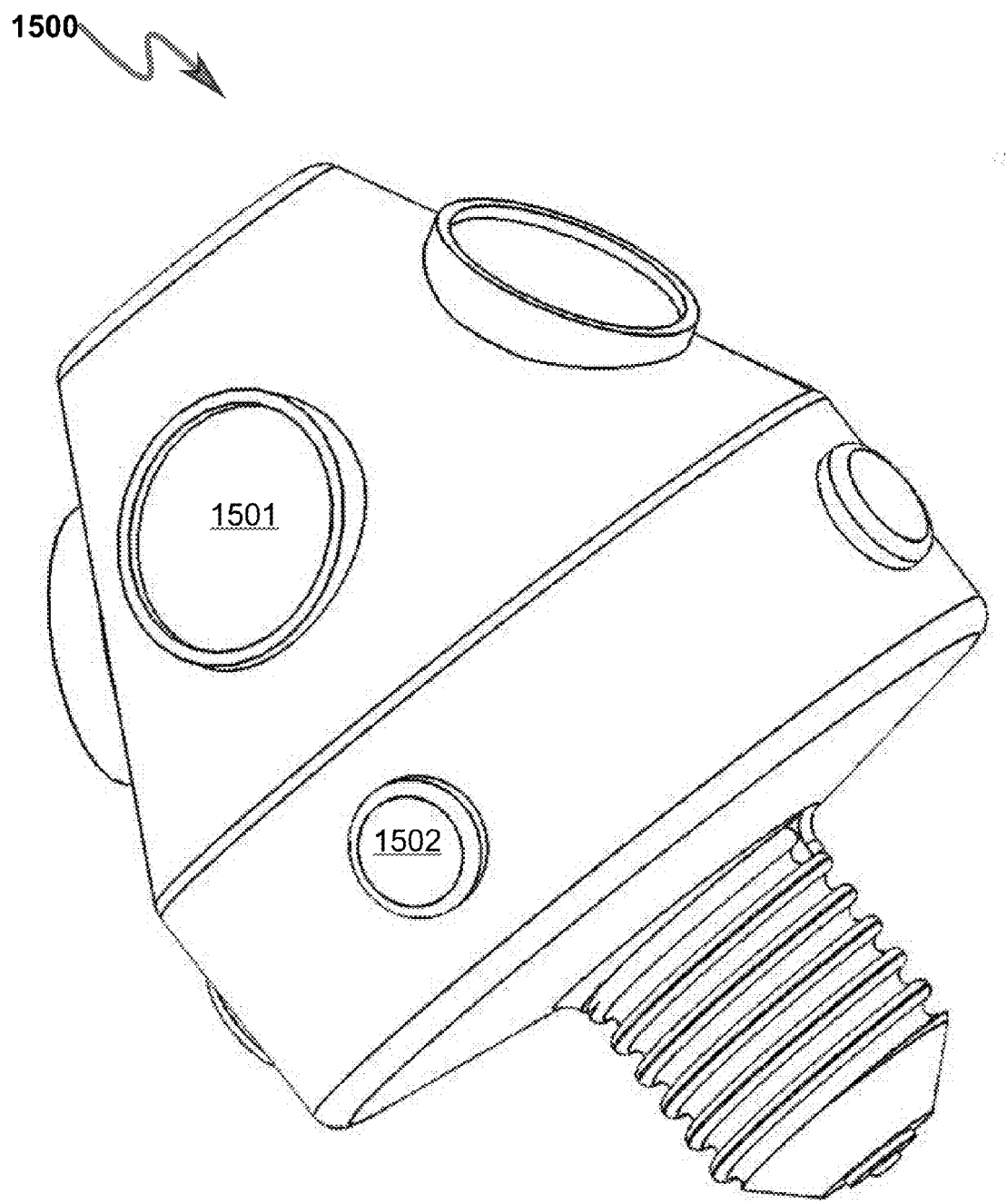
FIG. 15 illustrates an alternate exemplary retrofit SGPC security monitoring system adapted for use with standard screw-base lamps.

Of particular note is the embodiment illustrated in FIG. 15 (1500) and FIG. 16 (1600) wherein the SGPC enclosure supports multiple sensors (1501, 1502) that may include imaging sensors as well as other forms of environmental sensors.

Exemplary Fluorescent Lighting Integration (1700)-(2400)

Prior Art Baseline T12 Lighting Fixture

Figure 17:
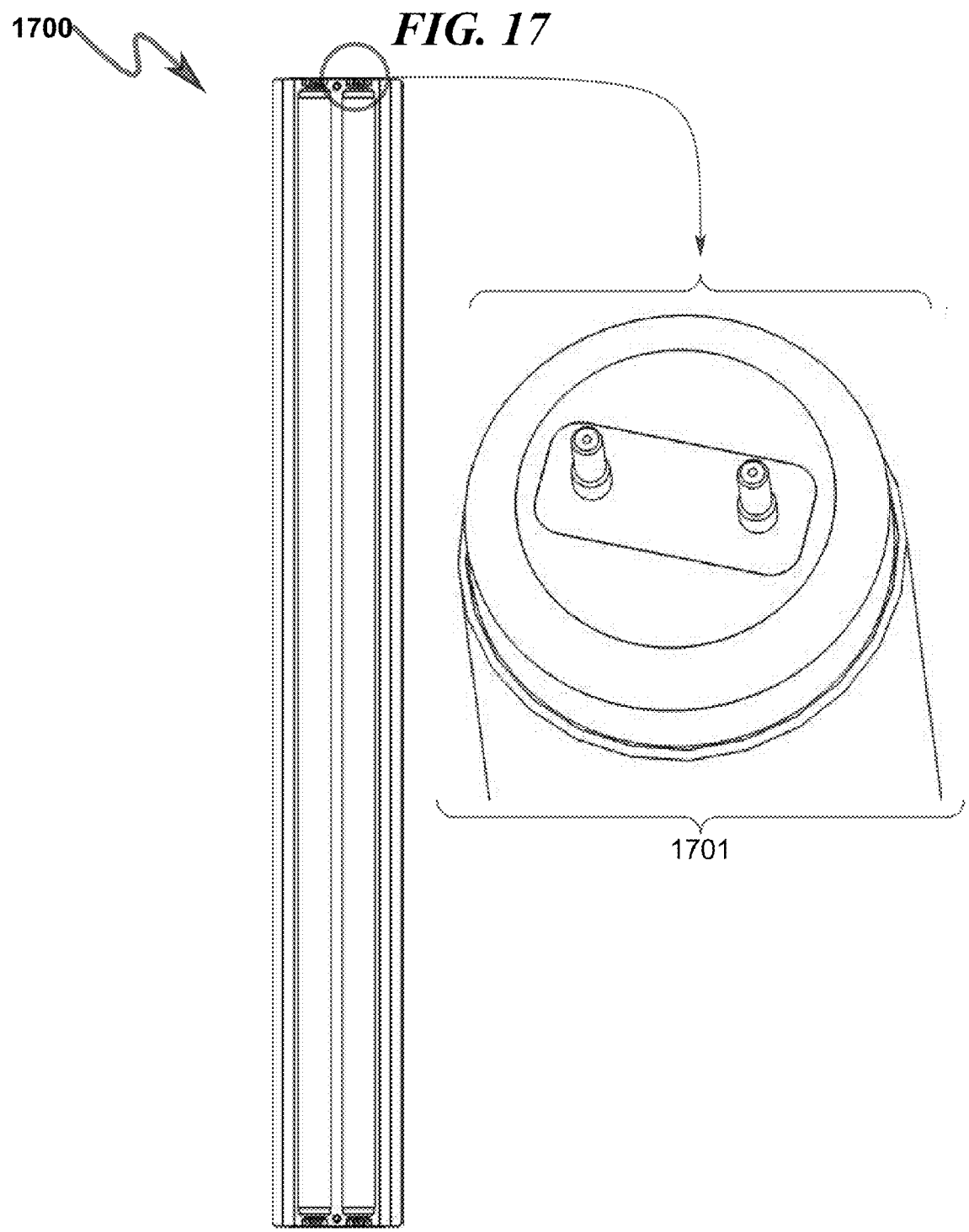
FIG. 17 illustrates a top view of a prior art fluorescent lighting fixture configured with dual T12 fluorescent lamps.
Figure 18:
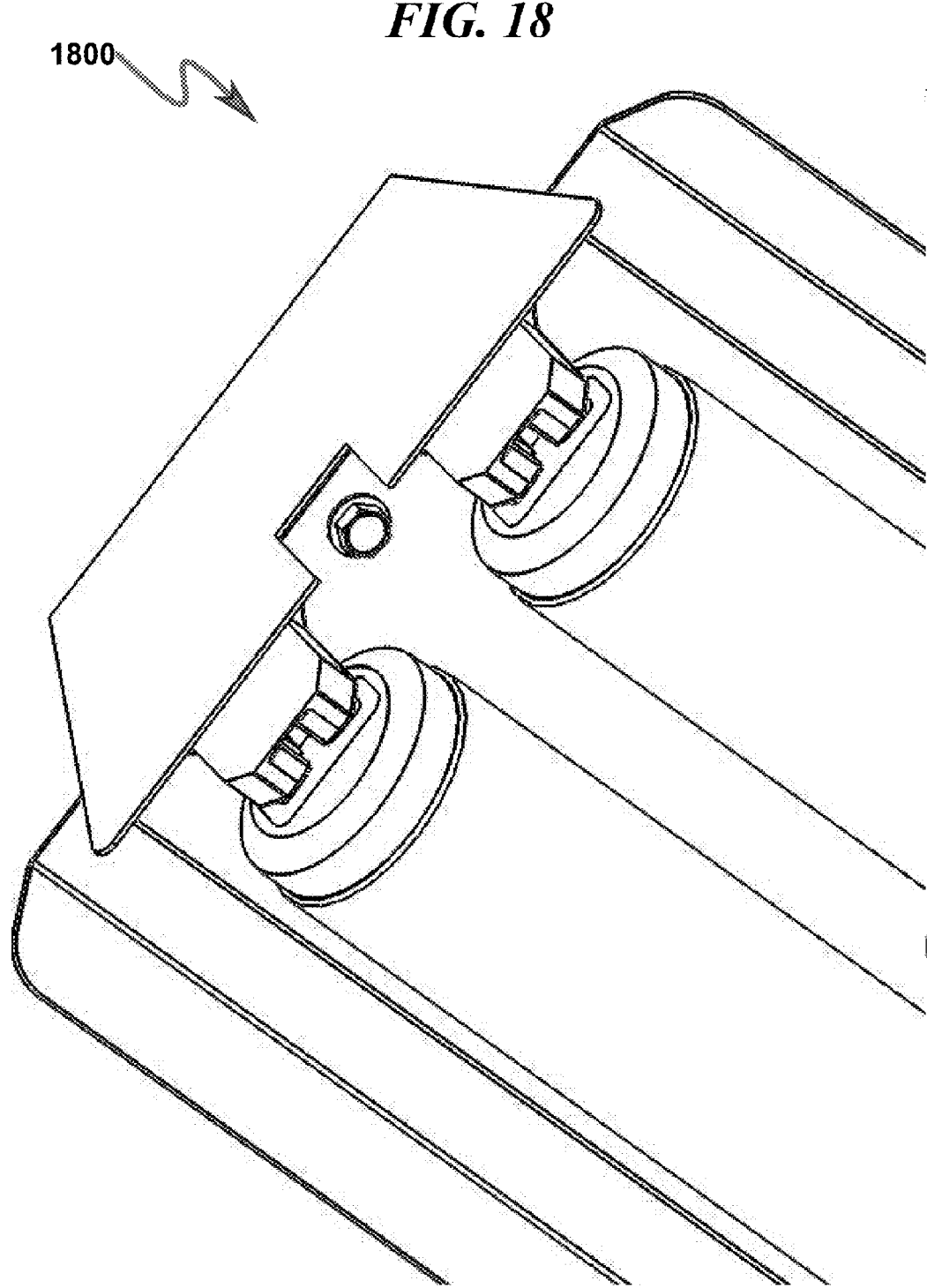
FIG. 18 illustrates a top perspective detail end view of a prior art fluorescent lighting fixture configured with dual T12 fluorescent lamps.
Figure 19:
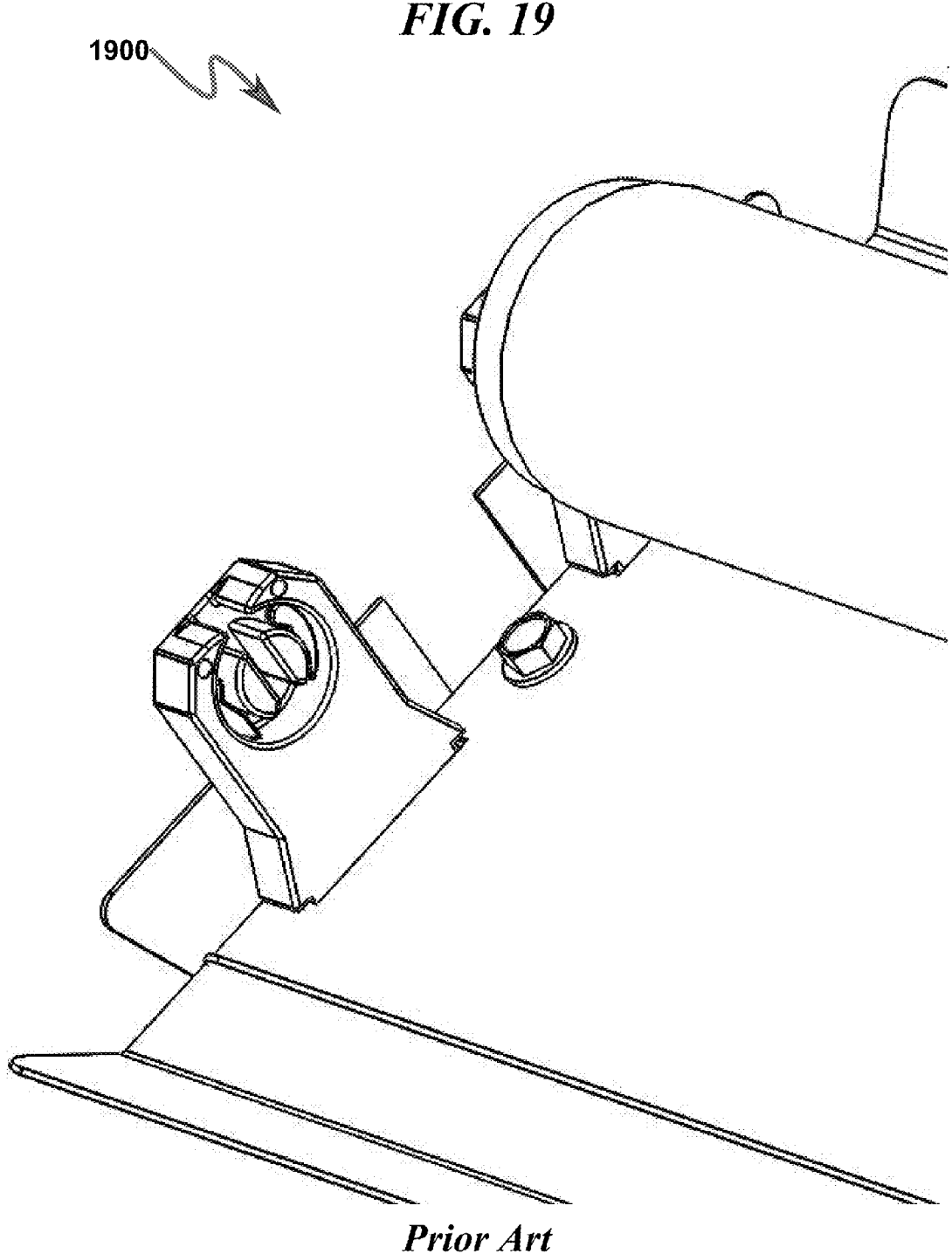
FIG. 19 illustrates a top perspective detail end view of a prior art fluorescent lighting fixture configured with dual T12 fluorescent lamps and detailing the G13 lamp connector.

One preferred embodiment of the present invention integrates the SGPC into conventional tube fluorescent lighting systems. An example of a typical two-tube T12 fluorescent lighting fixture is detailed in FIG. 17 (1700)-FIG. 20 (2000), with particular attention being drawn to the detail view of the G13 electrical connector (2010) in FIG. 20 (2000) that mates with the bayonet pins (1701) at the end of the T12 fluorescent tube. As can be seen from this detail diagram, the G13 connector (2010) typically incorporates two contacts (2021, 2031) supporting electrical contact with the T12 lighting tube and two sets of electrical connections (2022, 2032) that are connected to these contacts.

Present Invention Exemplary G13 Retrofit Application

Figure 20:
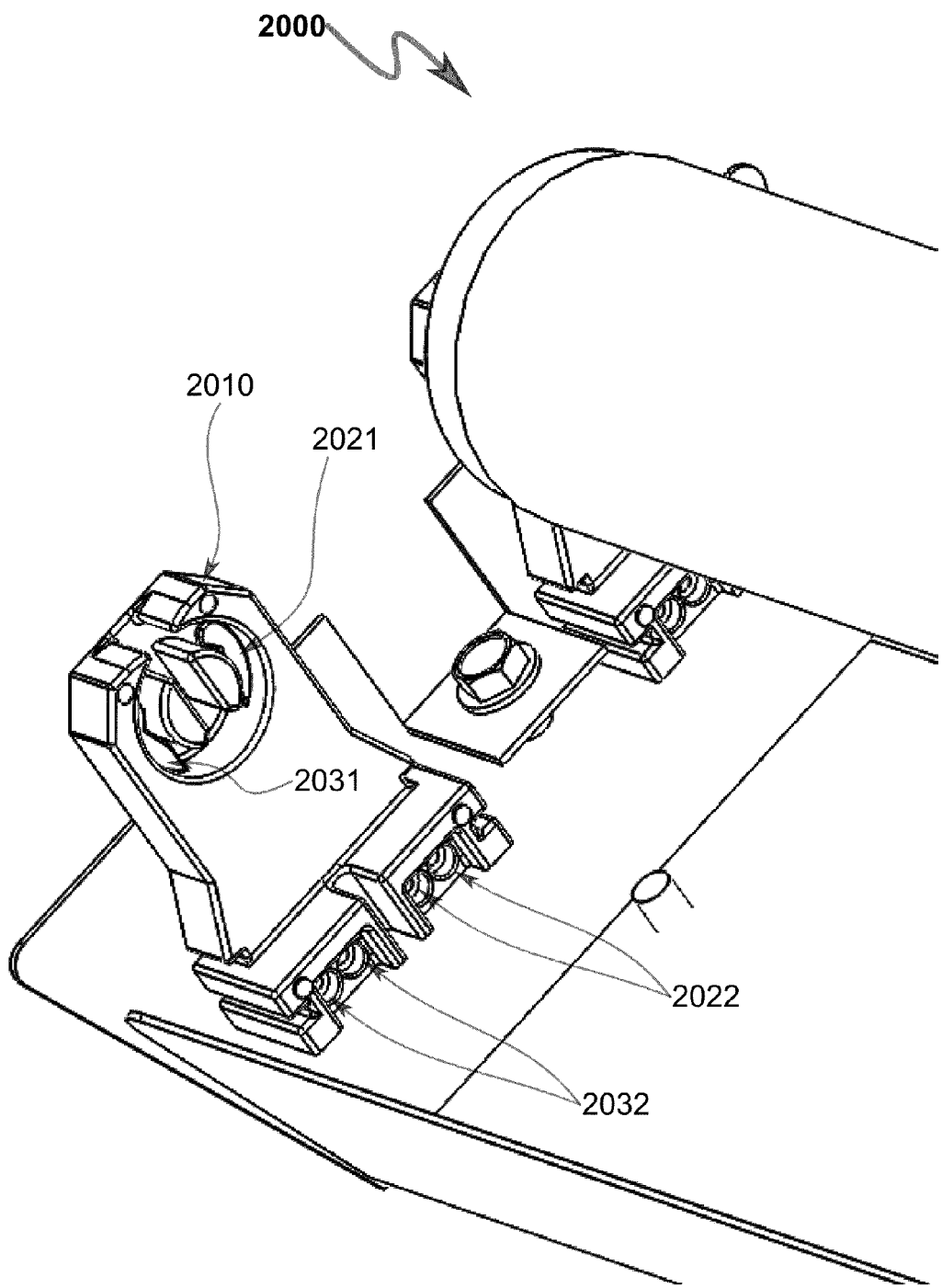
FIG. 20 illustrates a top perspective detail end view of a prior art fluorescent lighting fixture configured with dual T12 fluorescent lamps and detailing the G13 lamp connector electrical connection details.
Figure 24:
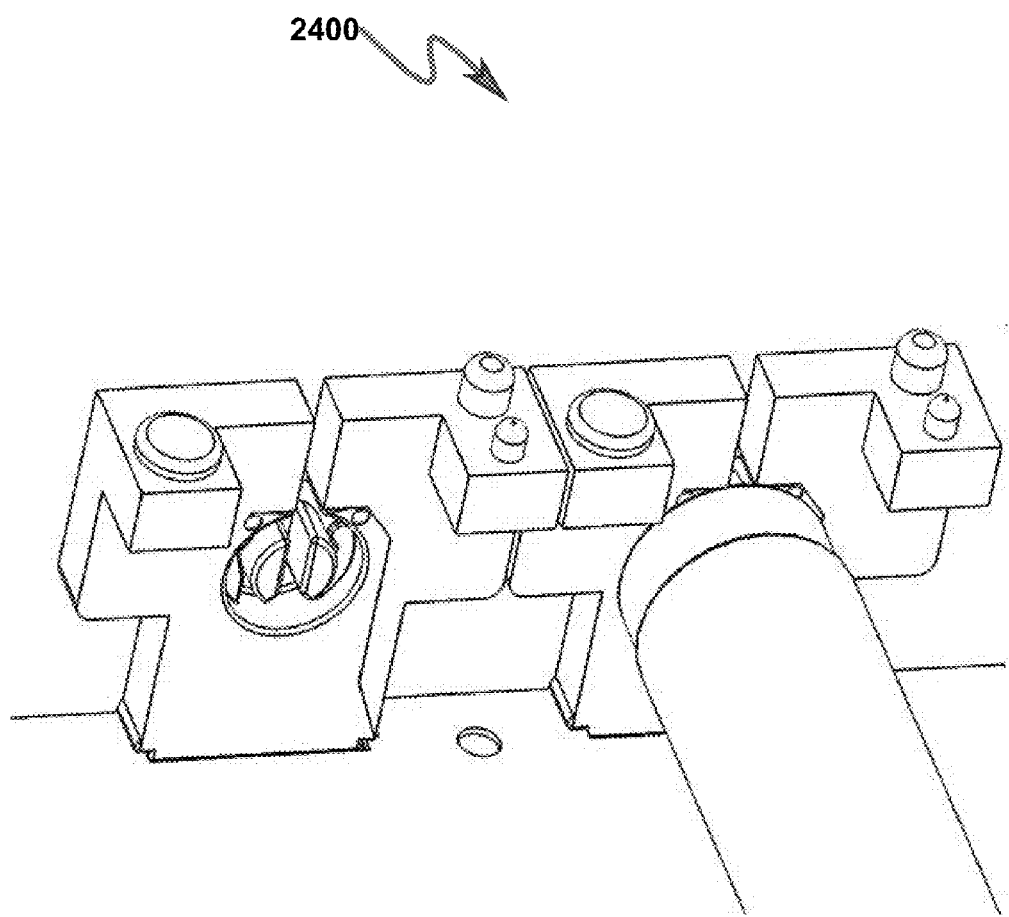
FIG. 24 illustrates a perspective view of an exemplary G13 fluorescent receptacle retrofit modification incorporating environmental motion sensors.

The present invention anticipates a modification of the G13 connector illustrated in FIG. 20 (2000) to incorporate a number of environmental sensors and also permit rapid replacement installation of T12-to-T5 and T12-to-T8 lighting in a variety of applications where security monitoring and control are desired to be implemented in a retrofit context. As generally illustrated in FIG. 21 (2100)-FIG. 24 (2400), a variety of retrofit modifications to the basic G13 socket are possible, with the incorporation of sensors (2101, 2102, 2103, 2104) as generally illustrated in FIG. 21 (2100) being easily accomplished while maintaining compatibility with existing mechanical constraints of the fluorescent lighting enclosure.

Figure 21:
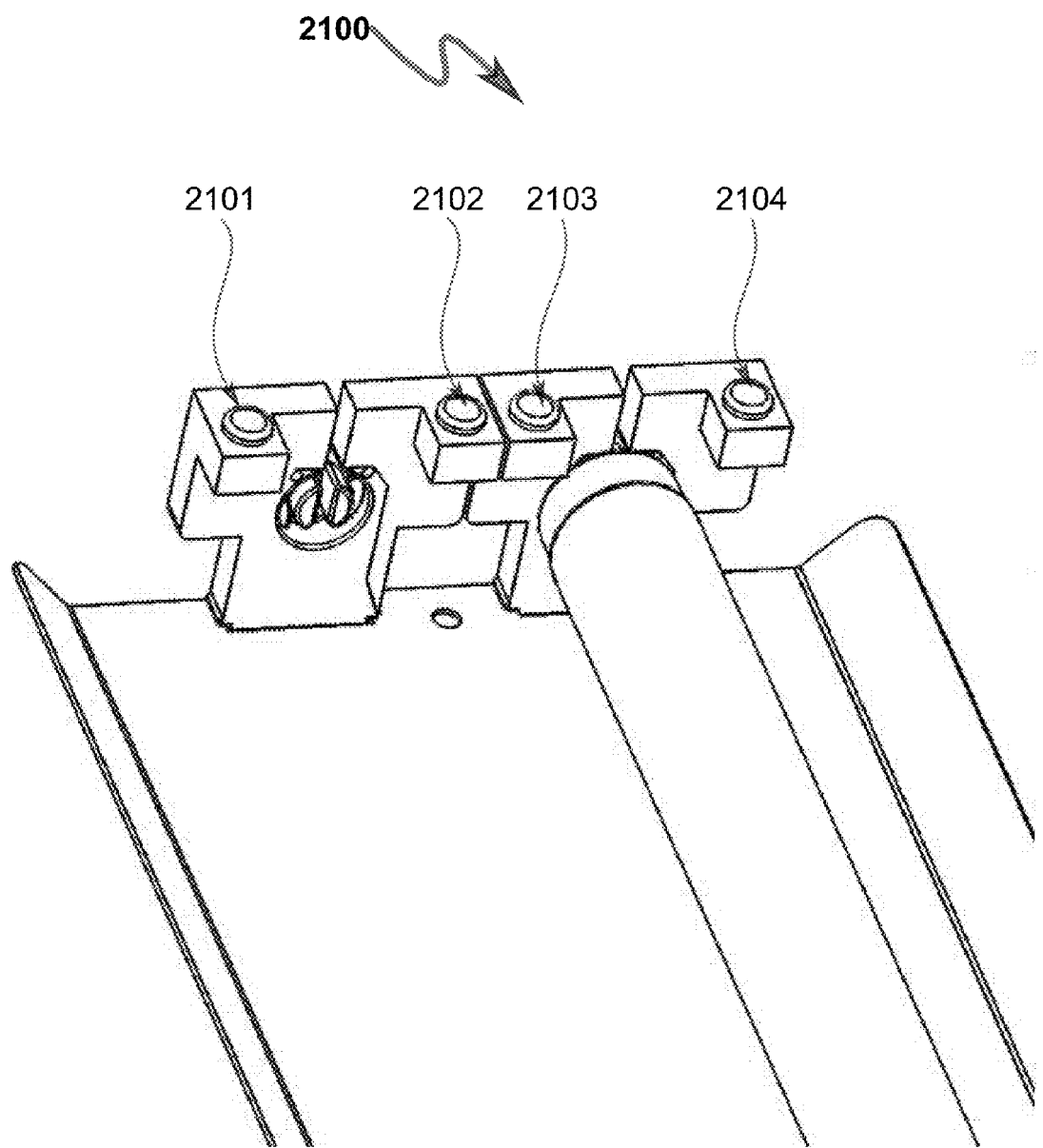
FIG. 21 illustrates a perspective view of an exemplary G13 fluorescent receptacle retrofit modification incorporating environmental imaging sensors.
Figure 22:
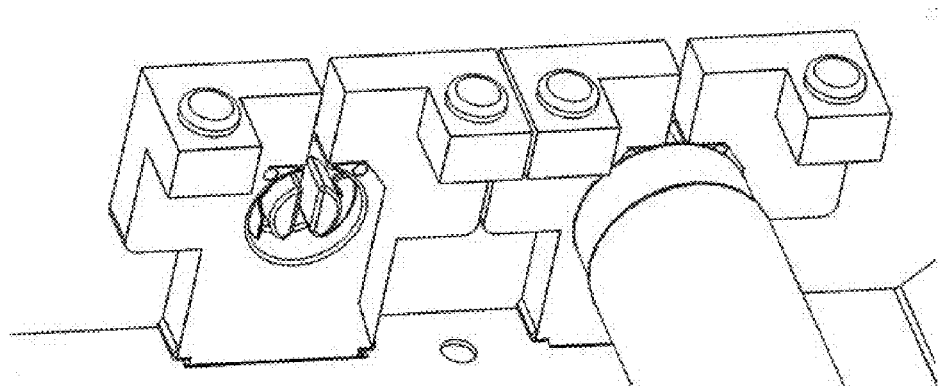
FIG. 22 illustrates a perspective view of an exemplary G13 fluorescent receptacle retrofit modification incorporating environmental imaging sensors.

As an example of the types of sensors anticipates in this application, FIG. 21 (2100) and FIG. 22 (2200) generally illustrate the use of imaging sensors (2101, 2102, 2103, 2104) configured within the modified G13 socket. FIG. 23 (2300) and FIG. 24 (2400) generally illustrate situations in which different types of sensors are combined, such as in infrared emitters coupled with infrared motion and/or imaging sensors (or equivalently the use of ultrasonic emitters and detectors). Thus, these various configurations anticipate both visible and invisible image monitoring within a security monitoring application. Note that the inclusion of infrared emitters in widespread application within a building environment permits invisible illumination of the structure with low power overhead while still providing for image capture of the secured areas covered by the fluorescent lighting fixtures.

Retrofit Security Application Context

It should be noted that the present invention in some preferred embodiments significantly improves on the ability to provide lighting control and simultaneously provide for security monitoring in retrofit application contexts. In these scenarios, a SGPC-retrofit-embedded lighting control is installed at the point of lighting service and a corresponding SGPC controller is installed to supply power to the lighting electrical service. In this fashion, power at the lighting service device can be continuously enabled, with actual power connections to the light device determined based on instructions received by the local SGPC. The SGPC located at the lighting device can be configured to collect sensor information and relay this back to the "host" SGPC or relayed to another SGPC for transport to the Internet web hosting service.

T12-T8 Retrofit Energy Savings (2500)-(2800)

The following discussion relates to invention embodiments that are directed to T12-to-T8 lamp conversions generally motivated by overall energy savings associated with T8 fluorescent lamps. This discussion specifically details T12-to-T8 conversions, but the present invention teachings not so limited and are equally applicable to T12-to-T5 conversions, T8-to-T5 conversions, and similar retrofit scenarios.

Anticipated T12-to-T8 Retrofit

The present invention specifically anticipates situations where the system and method may be utilized to retrofit T8 fluorescent lighting fixtures as replacements for existing T12 fluorescent lighting fixtures. High efficiency T8 lamps use 40% fewer watts, produce 40% less heat, and output 10% more lumens when compared to older magnetic T12 light fixtures.

T12 lamps and magnetic ballasts are considered outdated compared to the far more energy efficient T8 and T5 fluorescent technologies now available. The U.S. Department of Energy has a stated objective to remove less efficient T12 fluorescent systems from the market, resulting in improved lighting energy efficiency an ecological friendly environment for commercial applications and private households. To achieve this objective, manufacturers will be phasing out their production of T12 lamps thus there will be progressively less availability of T12 lamps for existing lighting applications.

Most of the T12 magnetic ballasts are already phased out. Cost of T12 lamps and ballasts will increase due to demand vs. limited supply. In addition, to keep up with federal regulations relating to energy efficiency, lighting manufacturer technology and production will be focused on T8 and T5 systems in the future.

Present Invention Retrofit Capabilities

The energy efficiency improvement associated with T12-to-T8 conversions (in conjunction with manufacturer phase-out of T12 lighting systems) has already spurred interest in T12-to-T8 conversions, but only as a means of reducing the energy consumption of the lighting system while activated, and NOT as a means of controlling WHEN the lighting system is activated.

In contrast, the present invention permits implementation of a T12-to-T8 retrofit with the added benefit of providing an overall control methodology wherein the lights within the lighting fixture can be individually controlled to reduce power consumption in a variety of "standby" modes or completely disconnected from the grid unless triggered by a calendar timed event or detection of motion within the security region of the lighting system.

Exemplary T12-to-T8 Retrofit Using SGPC Control

As stated previously, SGPC control can be utilized in a retrofit of T12-to-T8 lamps resulting in a high degree of energy conservation over conventional T12-to-T8 conversions. Examples of typical retrofit system contexts are provided in FIG. 25 (2500)-FIG. 27 (2700). Some background will now be provided before discussing the present invention T12-to-T8 retrofit embodiment.

As generally illustrated in FIG. 25 (2500), the primary method of operating T12 lamps over the years has been magnetic ballasts (2510) using rapid start technology. Rapid start configurations have two wires connected to each side of the lamp (2511, 2512, 2513, 2514). There is a small voltage between the two wires that is used to provide heat to the lamp's cathodes. An arc forms between the electrical connections in the cathodes, which produces light. When heated, the cathodes release an emitter, which is a substance that helps strike the arc across the lamp between the two cathodes. The voltage between each side of the lamp is required to maintain an arc over the length of the lamp tube. Rapid starting is relatively gentle on the cathodes and (when operated on short lighting cycles) the lamp does not sacrifice life due to the starting cycles. However, due to cathode heating, rapid start systems require several extra watts per lamp more than instant start systems.

Referencing FIG. 26 (2600), T8 lamps (2611, 2612, 2613) are designed as rapid-start lamps, as are T12 lamps, and they are capable of being operated on rapid start, programmed rapid start, or instant start ballasts. Electronic T8 ballasts (2610) are most commonly instant-start configurations, where there is no cathode heating. With an instant start configuration, a high voltage pulse is used to start the arc between the lamp's cathodes. The primary advantage of instant start systems is the energy saved since no power is required to heat the cathodes. The main disadvantage is reduced life when instant start systems are installed in applications that are frequently turned on and off.

Because of the power required to heat the cathodes, ballasts used in rapid start operations have four connections with each lamp (although two lamp ballasts often share the "return"). A typical two lamp rapid start configuration has two red wires going to lamp one, two blue wires going to lamp two, and a pair of yellow wires that act as "returns" back to the ballast that are shared by the lamps. In addition to the lamp circuit, the ballast has a black wire and a white wire and the ballast is grounded through the case fastened to the fixture.

Instant start systems are wired slightly differently than rapid start systems. Fewer wires exit the instant start ballasts and they have different color arrangements. One line connects to each lamp and a return line runs back to the ballast. Like rapid start ballasts, there is a white and a black wire entering the ballast, which is grounded through the case being fastened to the fixture.

FIG. 25 (2500) illustrates a conventional T12 fluorescent lighting application that utilizes a ballast (2510) in conjunction with four T12 fluorescent lamps (2511, 2512, 2513, 2514). This configuration when undergoing a T12-to-T8 retrofit is converted to a configuration as depicted in FIG. 26 (2600). Here the ballast (2610) and three lighting tubes (2611, 2612, 2613) replace the original ballast (2510) and four lighting tubes (2511, 2512, 2513, 2514) in FIG. 25 (2500). It is important to note that since three lighting tubes (2611, 2612, 2613) replace the four lighting tubes (2511, 2512, 2513, 2514) of the T12 configuration that there is also a necessity to replace the G13 socket adapters and mounting hardware associated with the lighting fixture as the lamp spacing is three per lighting fixture (individually equally spaced) as opposed to four per lighting fixture (paired equally spaced). The fact that the lamp mounting hardware must also be replace provides an opportunity in a retrofit application to augment these lamp electrical sockets with additional environmental sensors (2730) as well as provide the opportunity to individually enable/activate the T8 lamps (2711, 2712, 2713) within the lighting fixture under SGPC (2720) supervision.

Figure 27:
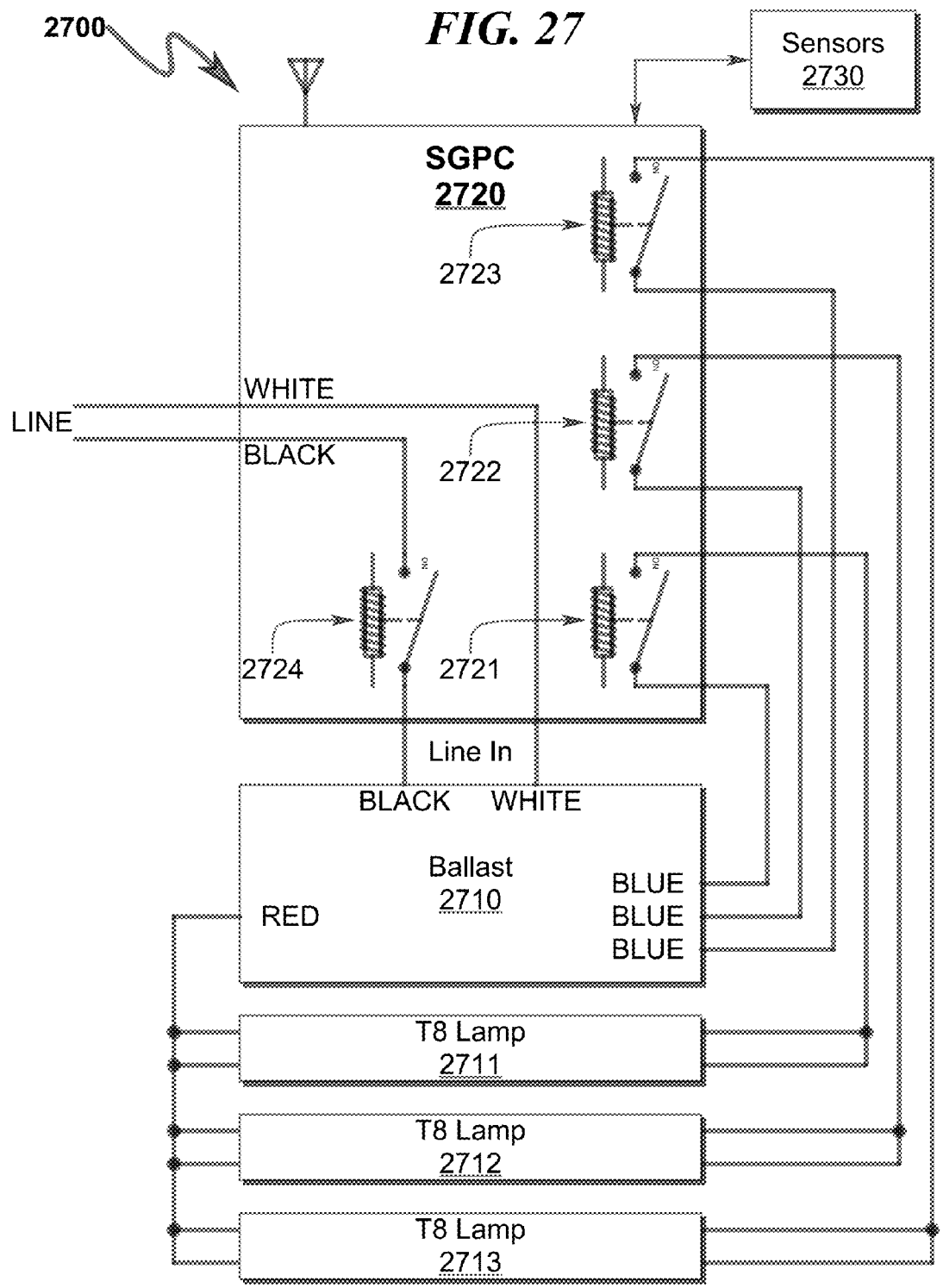
FIG. 27 illustrates an exemplary T8 fluorescent lighting schematic used in a retrofit T12-to-T8 application utilizing a SGPC lighting controller.

An exemplary methodology implementing this power-saving retrofit approach is generally illustrated in FIG. 27 (2700), wherein the new ballast (2710) is configured with three T8 lamps (2711, 2712, 2713), but additional wiring is provided for connection to a SGPC controller (2720) that operates individual relays (or other electrical switching elements) (2721, 2722, 2723) to control operation of each individual lamp (2711, 2712, 2713) independently. An additional relay (or other electrical switching element) (2714) may be provided to completely remove power from the ballast (2710) as a means of reducing lighting power consumption to near zero.

Integration With Solid-State Fluorescent Ballast Systems

Figure 28:
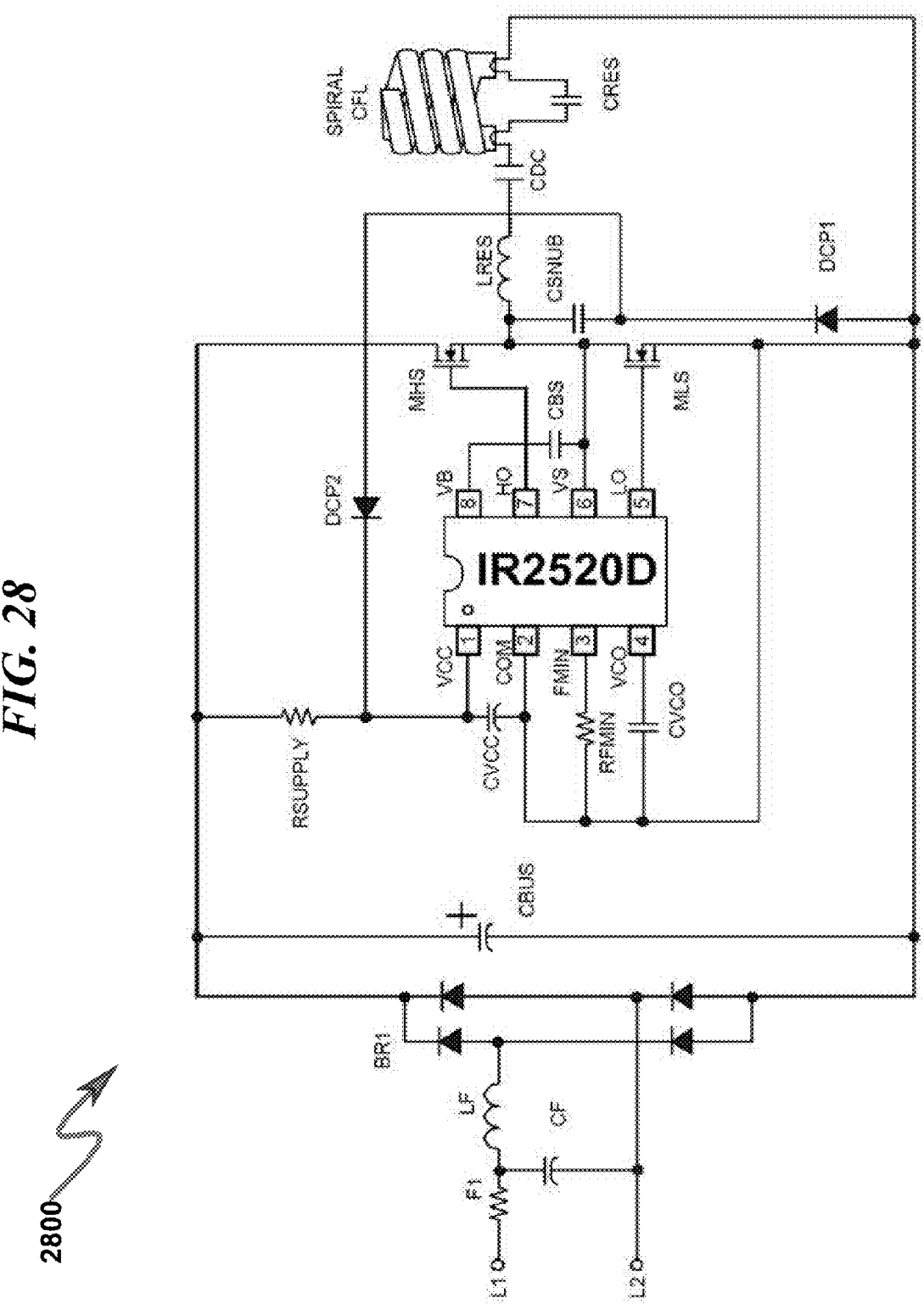
FIG. 28 illustrates an exemplary solid-state ballast schematic useful in implementing some retrofit applications utilizing a SGPC lighting controller.

The present invention anticipates that in some circumstances the SGPC may be integrated with a solid state ballast system and thus replace the existing ballast in a T12 retrofit application with a single PCB (or encapsulated component) incorporating both SGPC and solid state ballast functionality. An exemplary solid-state ballast circuit suitable in this application is generally depicted in FIG. 28 (2800), wherein an International Rectifier (IR) model IR2520 circuit is depicted. Other suitable solid-state ballast controls in this application include the International Rectifier (IR) model IR2156 and others similarly available from other integrated circuit manufacturers.

Energy Conservation

By allowing an alternate form of T12-to-T8 fluorescent lighting retrofit that incorporates the ability to individually control lamp activation within a given lighting fixture, the present invention permits additional energy savings to occur while also providing an integrated methodology to provide security monitoring as a side benefit of the retrofit installation. This energy savings can be substantial, as a typical three-bulb T8 retrofit can be reduced to a single bulb in "standby" mode to reduce overall power consumption by 66% over the conventional T12-to-T8 retrofit. Finally, the ability to completely disable a given lighting fixture while still collecting environmental sensor data provides the opportunity to optimize energy consumption over large building infrastructures that were previously unserviced due to the high cost of deploying prior art environmental monitoring and control systems.

SGPC Security Monitor Placement Definition Method (2900)

One feature of some preferred invention embodiments is a GUI-based physical placement tool to allow graphical maps to be associated with the placement of SGPC security monitoring devices. This permits, for example, a city map to be used to locate installation of SGPC SM devices as retrofits within existing street lighting. Another example of this might be the use of the placemen definition within the context of a large building structure. This graphical definition and association with the SGPC SM systems permits a visual display of environmental security sensor placement to be associated with sensor data (video, etc.) from the particular location.

Figure 29:
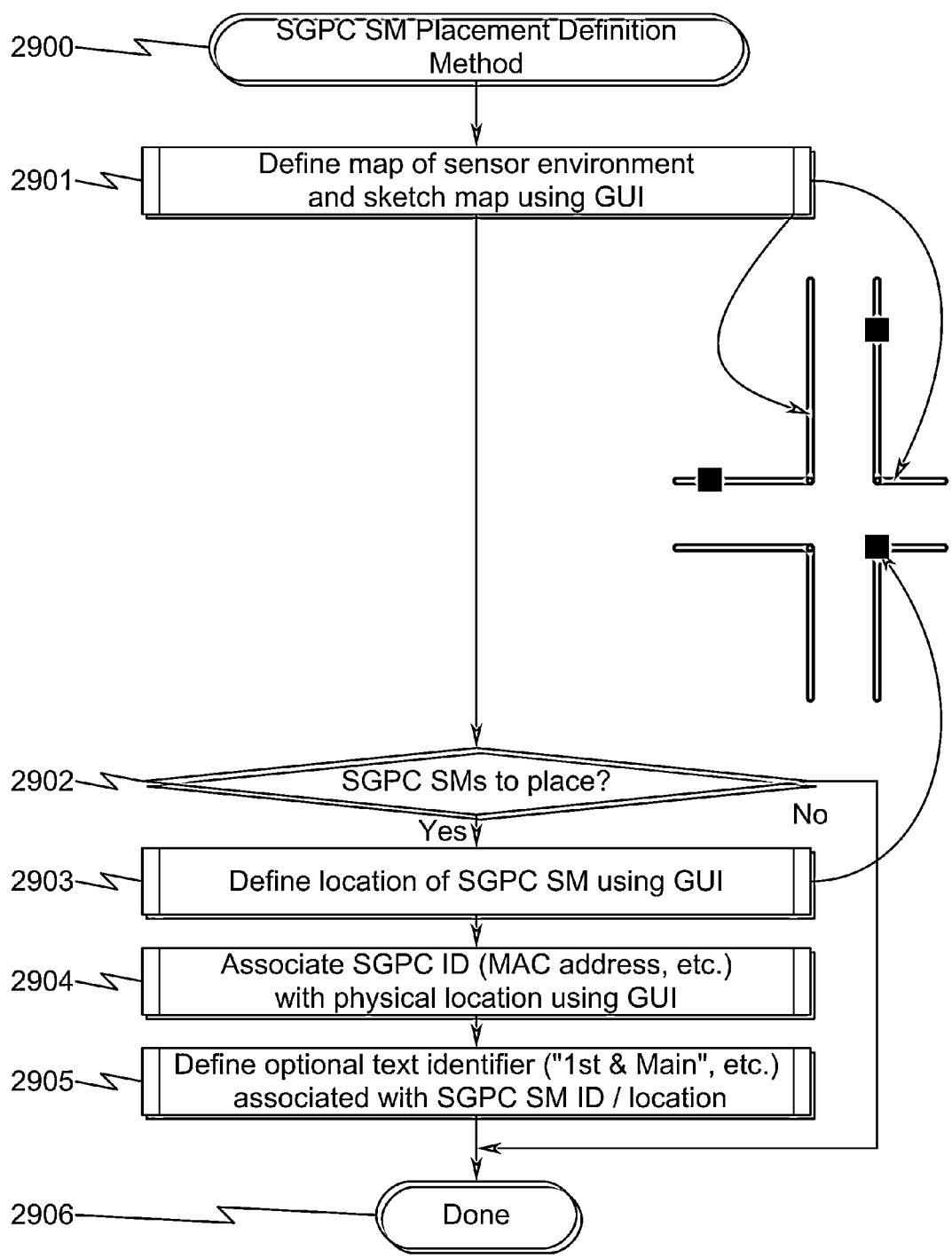
FIG. 29 illustrates an exemplary SGPC security monitor placement definition method useful in some preferred invention embodiments.

As generally depicted in FIG. 29 (2900), the present invention system may implement a security monitoring SGPC placement definition method, wherein the security monitoring system described previously is controlled by a method having the following steps:
 (1) Sketching an image placement map of the SGPC sensor environment using a GUI (2901);
 (2) Determining if there are more SGPC security monitors (SM) to place, and if not, proceeding to step (6) (2902);
 (3) Defining the location of the SGPC SM installation within the placement map using a GUI (2903);
 (4) Associating the SGPC SM unique identifier (MAC address, etc.) with the physical installation location using a GUI (2904);
 (5) Defining optional text identifier with the SGPC SM to permit easier identification of security events associated with the SGPC SM (2905); and
 (6) Terminating the method (2906).

Integration of this and other preferred exemplary embodiment methods in conjunction with a variety of preferred exemplary embodiment systems described herein is anticipated by the overall scope of the present invention.

This method may be used in conjunction with a wide variety of CAD and mapping software to associate the location of a given SGPC security monitor (SM) to switching/sensor data associated with the SGPC. Thus, as the individual SGPCs are installed along a path of street lighting or within a building structure, these units may be mapped to the individual locations and thus provide a method of visually selecting the individual sensors based on the placement map.

SGPC Security Monitor Sensor Definition Method (3000)

One feature of some preferred invention embodiments is a GUI-based tool that permits configuration of individual sensors within a given SGPC and where information collected by the sensors should be sent upon collection. This GUI may include the ability to define web pages that are filled with content extracted from the sensors, such as image data, audio data, and streaming video. A wide variety of sensor definitions is anticipated within this context.

Figure 30:
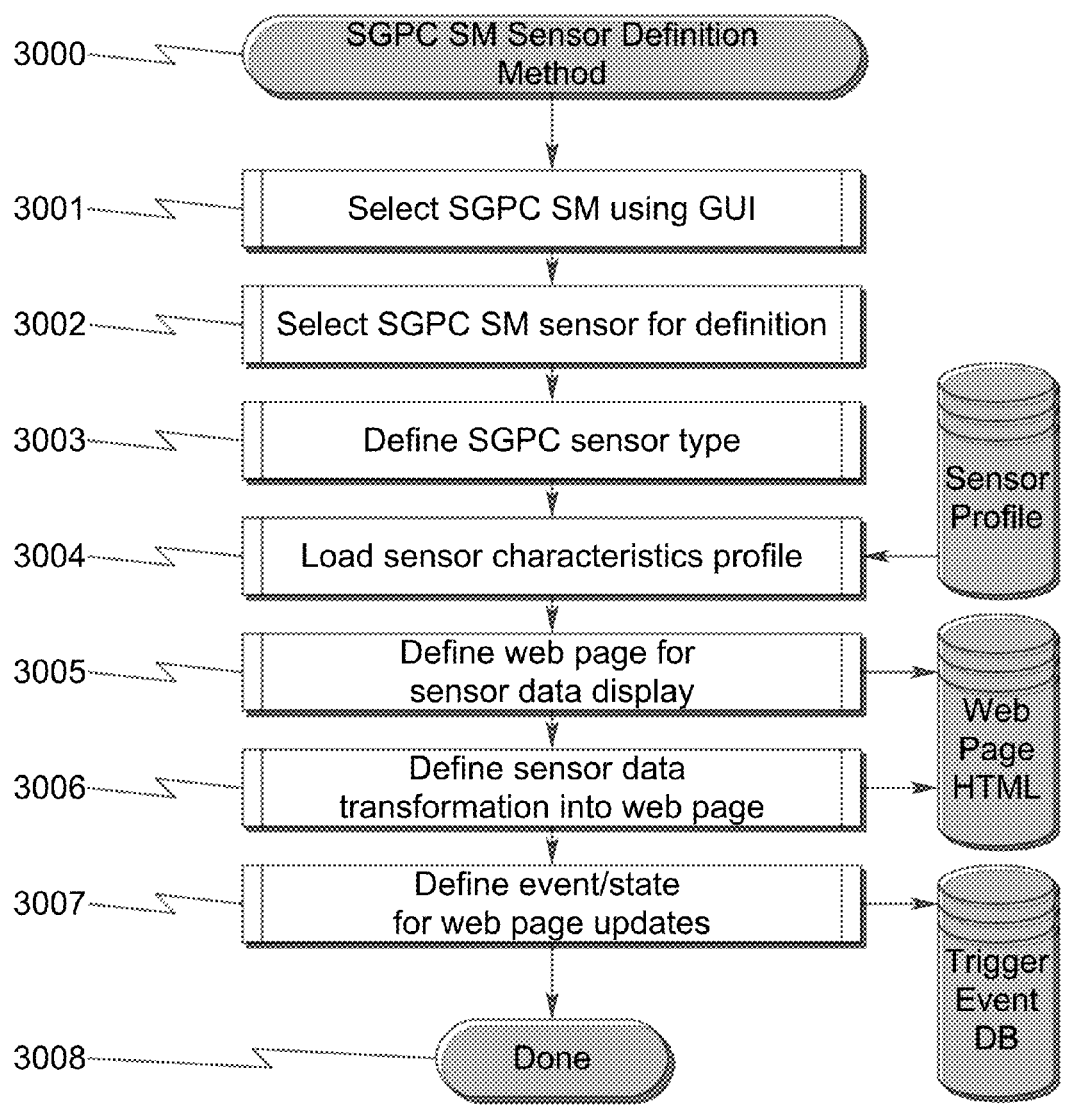
FIG. 30 illustrates an exemplary SGPC security monitor sensor configuration method useful in some preferred invention embodiments.

As generally depicted in FIG. 30 (3000), the present invention system may implement a security monitoring SGPC sensor definition method, wherein the security monitoring system described previously is controlled by a method having the following steps:
 (1) Selecting a SGPC SM using a GUI on a computing device (3001);
 (2) Selecting the SGPC sensor for definition (3002);
 (3) Defining the SGPC sensor type (3003);
 (4) Loading sensor characteristics from a sensor profile database (3004);
 (5) Defining a web page for sensor data display (3005);
 (6) Defining a sensor transform process/function to transform the sensor data into the web page (3006);
 (7) Defining event/state conditions that trigger an update of the sensor data to the web page (3007); and
 (8) Terminating the method (3008).

Integration of this and other preferred exemplary embodiment methods in conjunction with a variety of preferred exemplary embodiment systems described herein is anticipated by the overall scope of the present invention.

This method allows a wide variety of sensor types to be attached to the SGPC and monitored for data collection. The ability to define web pages that are hosted by the SGPC and available for viewing over the Internet permits the sensor data to be transformed and displayed in a wide variety of useful formats. For example, streaming video or image data may be displayed in addition to other environmental information such as carbon monoxide levels, temperature, humidity, etc.

SGPC Security Monitor Event Reporting Definition Method (3100)

One feature of some preferred invention embodiments is a GUI-based tool that permits configuration of messages that are to be triggered on detected sensor events. This capability permits forwarding of e-mails, text messages, and other information based on the detection of a given sensor event.

Figure 31:
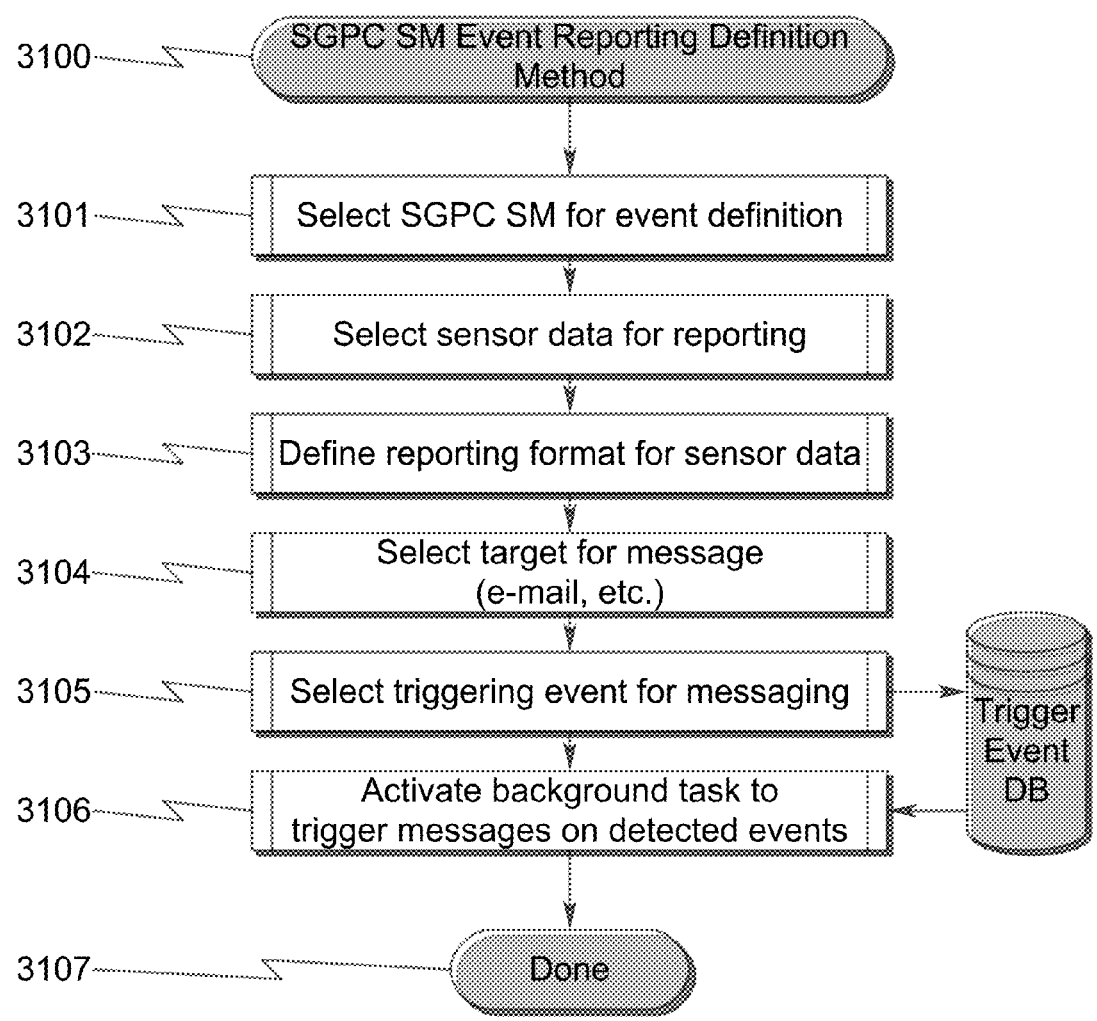
FIG. 31 illustrates an exemplary SGPC security monitor event reporting method useful in some preferred invention embodiments.

As generally depicted in FIG. 31 (3100), the present invention system may implement a security monitoring SGPC event reporting method, wherein the security monitoring system described previously is controlled by a method having the following steps:
 (1) Selecting a SGPC SM using a GUI on a computing device (3101);
 (2) Selecting the SGPC sensor data that is to be reported (3102);
 (3) Defining a reporting format for the sensor data (3103);
 (4) Selecting a target for the transmission of the event message (this could be e-mail, text message address, etc.) (3104);
 (5) Selecting a triggering event that will execute the generation and transmission of the event message (3105);
 (6) Activating a background task within the SGPC to trigger messages based on detected triggering events that have been previously defined (3106); and
 (7) Terminating the method (3107).

Integration of this and other preferred exemplary embodiment methods in conjunction with a variety of preferred exemplary embodiment systems described herein is anticipated by the overall scope of the present invention.

This method allows events associated with a particular SGPC sensor to trigger messaging and other events specific to a given SGPC. Thus, for example, a SGPC may be configured with a motion sensor and an event defined to notify central security via e-mail or text message in the event of detected motion within a high security area. Similar reporting can be triggered based on the detection of fires, light, or other environmental conditions.

SGPC Security Monitor Security Group Definition Method (3200)

One feature of some preferred invention embodiments is a GUI-based tool that permits configuration of groups of SGPCs so that they operate as a singular security network. For example, if a group of SGPCs were to be deployed in a high security area of a building, this method would allow detected events by one SGPC to be tracked on all units in the group. An example of this might be activation of lighting in an area when the area perimeter is breached, or the activation of an intrusion alarm, etc.

Figure 32:
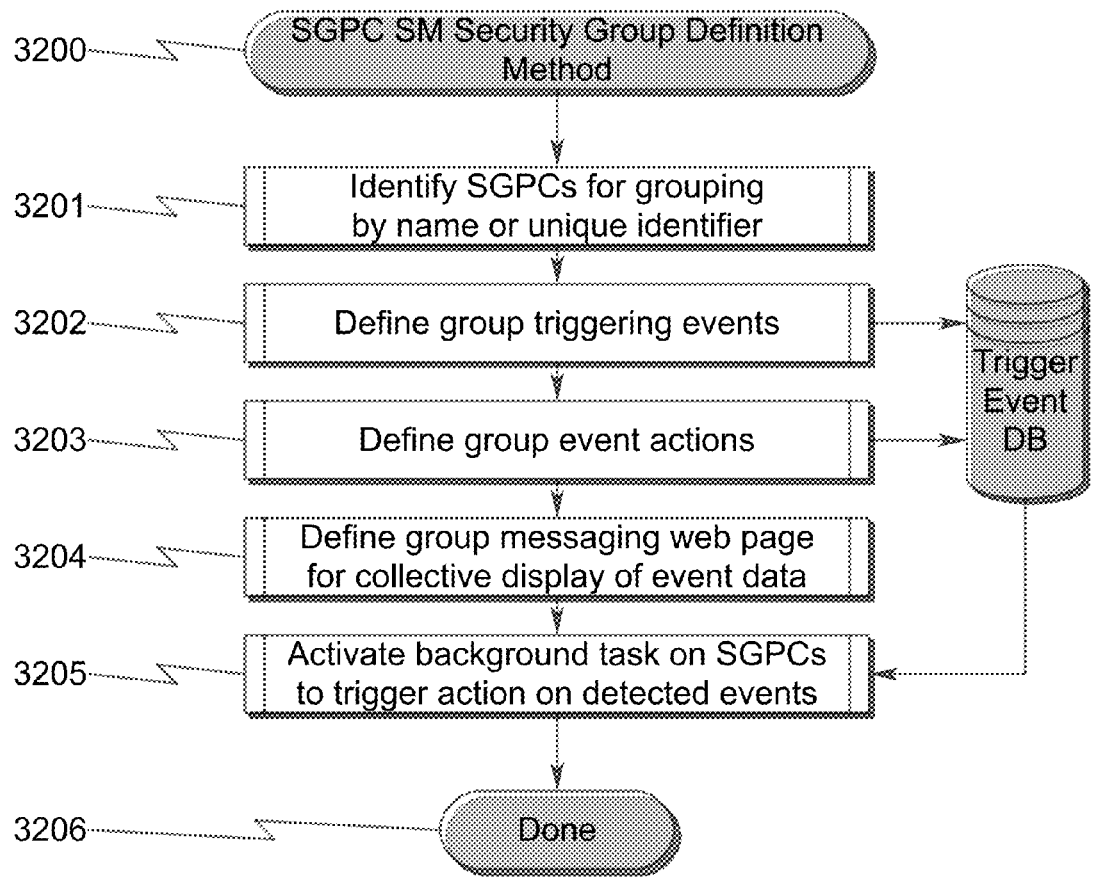
FIG. 32 illustrates an exemplary SGPC security monitor security grouping definition method useful in some preferred invention embodiments.

As generally depicted in FIG. 32 (3200), the present invention system may implement a security monitoring SGPC security group definiton method, wherein the security monitoring system described previously is controlled by a method having the following steps:
(1) Identifying SGPCs for grouping by name or unique identifier using a GUI operating on a computing device (3201);
(2) Defining events that will trigger group action (3202);
(3) Define actions to be triggered on the detection of a group event (3203);
(4) Defining a group messaging web page to collectively display the results of the group detected event (3204);
(5) Activating a background task on each SGPC in the group to trigger action based on detected events within the group (3205); and
(6) Terminating the method (3206).

Integration of this and other preferred exemplary embodiment methods in conjunction with a variety of preferred exemplary embodiment systems described herein is anticipated by the overall scope of the present invention.

This method allows collections of SGPCs to act in unison with respect to processing of security events. A good example of this might be in the use of SGPC configured in multiple perimeters around a secure location wherein each perimeter is associated with an individual reporting group and thus penetration of each individual perimeter triggers a separate group security alert.

Preferred Embodiment System Summary

The present invention preferred exemplary system embodiment anticipates a wide variety of variations in the basic theme of construction, but can be generalized as a SGPC security monitoring system comprising:
(a) source electrical input connector (SEIC); and
(b) sink electrical output connector (SEOC);
(c) lamp dimmer control (LDC);
(d) integrated computing device (ICD);
(e) light fixture adapter sensor (LFAS); and
(f) wireless communication interface (WCI);
wherein
the SEIC, the SEOC, the LDC, the ICD, the LFAS, and the WCI are contained within a cylindrical housing configured to be installed between an existing electrical lamp and an existing electrical lamp fixture;
the LDC is configured to control the flow of electrical current from the SEIC to the SEOC under direction of the ICD;
the ICD is configured to monitor the LFAS;
the ICD is configured to control the LDC in response to inputs from the LFAS;
the ICD is configured to monitor the WCI;
the ICD is configured to control the LDC in response to inputs from the WCI;
the ICD is configured with a web-browser interface permitting remote monitoring of the LFAS via the WCI and remote control of the LDC via the WCI;
the ICD is configured to execute instructions stored in a lamp fixture adapter program (LFAP);
the LFAP is configured to allow local control and monitoring of the LDC in response to inputs from the LFAS;
the LFAP is configured to allow local control and monitoring of the LFAS in response to inputs from the WCI;
the LFAP is configured to allow the LFAS to be monitored and controlled by the web-browser interface;
the LFAP is configured to allow reporting of LFAS detected events to the WCI;
the LFAP is configured to be remotely programmable via the WCI via the web-browser interface; and
the ICD is configured to collect data from the LFAS based on configuration information defined by a web-browser interface hosted by the ICD and transmit the collected data to a remote computing device via the WCI thru a wireless router connected to the Internet.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a security monitoring method, the method operating in conjunction with a SGPC security monitoring system comprising:
(a) source electrical input connector (SEIC); and
(b) sink electrical output connector (SEOC);
(c) lamp dimmer control (LDC);
(d) integrated computing device (ICD);
(e) light fixture adapter sensor (LFAS); and
(f) wireless communication interface (WCI);
wherein
the SEIC, the SEOC, the LDC, the ICD, the LFAS, and the WCI are contained within a cylindrical housing configured to be installed between an existing electrical lamp and an existing electrical lamp fixture;
the LDC is configured to control the flow of electrical current from the SEIC to the SEOC under direction of the ICD;
the ICD is configured to monitor the LFAS;
the ICD is configured to control the LDC in response to inputs from the LFAS;
the ICD is configured to monitor the WCI;
the ICD is configured to control the LDC in response to inputs from the WCI;
the ICD is configured with a web-browser interface permitting remote monitoring of the LFAS via the WCI and remote control of the LDC via the WCI;
the ICD is configured to execute instructions stored in a lamp fixture adapter program (LFAP);
the LFAP is configured to allow local control and monitoring of the LDC in response to inputs from the LFAS;
the LFAP is configured to allow local control and monitoring of the LFAS in response to inputs from the WCI;
the LFAP is configured to allow the LFAS to be monitored and controlled by the web-browser interface;
the LFAP is configured to allow reporting of LFAS detected events to the WCI;
the LFAP is configured to be remotely programmable via the WCI via the web-browser interface; and
the ICD is configured to collect data from the LFAS based on configuration information defined by a web-browser interface hosted by the ICD and transmit the collected data to a remote computing device via the WCI thru a wireless router connected to the Internet;
wherein the method comprises the steps of:
(1) Determining if the computer network is available, and if not, proceeding to step (5);
(2) Connecting to the computer network;
(3) Establishing a web-based Internet security monitoring and control interface;
(4) Loading the LFAP from the web-server based on a user configuration setup;
(5) Executing LFAP instructions on the ICD to monitor the LFAS and control the LDC;
(6) Determining if a LFAS event has occurred and if not, proceeding to step (8);
(7) Reporting the event and/or sending data to a web-based remote interface;
(8) Determining if LDC control is required by a local or remote control instruction, and if not, proceeding to step (1);
(9) Executing a dimming instruction protocol on the LDC based on LFAS input;
(10) Determining if LFAS data or relayed data from another LFA has been received, and if not, proceeding to step (1); and
(11) Forwarding LFAS data to a target data recipient over the Internet and proceeding to step (1).

One skilled in the art will recognize that these method steps may be augmented or rearranged without limiting the teachings of the present invention. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the computer network comprises the Internet.
An embodiment wherein the SEIC comprises an E26 light bulb socket and the SEOC comprises an E26 light bulb receptacle.
An embodiment wherein the data collection is determined by data read from the LFAS by the ICD.
An embodiment wherein the WCI is configured to communicate with other light fixture adapters (LFAs) via a wireless communication network.
An embodiment wherein the WCI is configured to operate as a router within a group of light fixture adapters (LFAs).
An embodiment wherein the operation of the LDC is determined by the state of a wall mounted electrical switch that is sensed by an ICD in a remote LFA.
An embodiment wherein the LFA is configured for retrofit into existing T12 or T8 fluorescent lighting fixtures.

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A security monitoring system/method implementing distributed Internet-based environmental monitoring and control has been disclosed. The system utilizes a smart gateway power controller (SGPC) configured for new/retrofit installation into electrical power distribution networks to allow controlled connection of an AC power source to a customer load device under direction of local or remote Internet direction. The SGPC may also be configured with sensors to detect motion, audio, video, visual images, smoke, carbon monoxide, carbon dioxide, light/darkness, and other environmental data. The SGPC may be configured using a local web-based graphical user interface (GUI) to relay collected sensor information to a remote web browser hosted on a remote computing device. The GUI may incorporate a configuration/setup interface allowing mapping of sensor data to information associated with the sensor location and triggered security reports to occur based on collected sensor data.

What is claimed is:
1. A security monitoring system comprising a light fixture adapter (LFA) further comprising:
(a) source electrical input connector (SEIC);
(b) sink electrical output connector (SEOC);
(c) lamp dimmer control (LDC);
(d) integrated computing device (ICD);
(e) light fixture adapter sensor (LFAS); and
(f) wireless communication interface (WCI);
wherein:
said SEIC, said SEOC, said LDC, said ICD, said LFAS, and said WCI are contained within a cylindrical housing configured to be installed between an existing electrical lamp and an existing electrical lamp fixture;
said LDC is configured to control the flow of electrical current from said SEIC to said SEOC under direction of said ICD;

said LFAS comprises an imaging sensor;
said ICD is configured to monitor said LFAS;
said ICD is configured to control said LDC in response to inputs from said LFAS;
said ICD is configured to monitor said WCI;
said ICD is configured to control said LDC in response to inputs from said WCI;
said ICD is configured with a web-browser interface permitting remote monitoring of said LFAS is said WCI;
said ICD is configured with a web-browser interface permitting remote control of said LDC via said WCI;
said ICD is configured to execute instructions stored in a lamp fixture adapter program (LFAP);
said LFAP is configured to allow local control and monitoring of said LDC in response to inputs from said LFAS;
said LFAP is configured to allow local control and monitoring of said LFAS in response to inputs from said WCI;
said LFAP is configured to allow said LFAS to be monitored and controlled by said web-browser interface;
said LFAP is configured to allow reporting of LFAS detected events to said WCI;
said LFAP is configured to be remotely programmable via said WCI via said web-browser interface; and
said ICD is configured to collect data from said LFAS based on configuration information defined by a web-browser interface hosted by said ICD and transmit said collected data to a remote computing device via said WCI thru a wireless router.

2. The security monitoring system of claim 1 wherein said SEIC comprises an E26 light bulb socket and said SEOC comprises an E26 light bulb receptacle.

3. The security monitoring system of claim 1 wherein said data collection is determined by data read from said LFAS by said ICD.

4. The security monitoring system of claim 1 wherein said WCI is configured to communicate with other light fixture adapters (LFAs) via a wireless communication network.

5. The security monitoring system of claim 1 wherein said WCI is configured to operate as a router within a group of light fixture adapters (LFAs).

6. The security monitoring system of claim 1 wherein operation of said LDC is determined by the state of a wall mounted electrical switch that is sensed by an ICD in a remote LFA.

7. A security monitoring method, said method operating in conjunction with a security monitoring system comprising a light fixture adapter (LFA) comprising:
(a) source electrical input connector (SEIC);
(b) sink electrical output connector (SEOC);
(c) lamp dimmer control (LDC);
(d) integrated computing device (ICD);
(e) light fixture adapter sensor (LFAS); and
(f) wireless communication interface (WCI);
wherein:
said SEIC, said SEOC, said LDC, said ICD, said LFAS, and said WCI are contained within a cylindrical housing configured to be installed between an existing electrical lamp and an existing electrical lamp fixture;
said LDC is configured to control the flow of electrical current from said SEIC to said SEOC under direction of said ICD;
said LFAS comprises an imaging sensor;
said ICD is configured to monitor said LFAS;
said ICD is configured to control said LDC in response to inputs from said LFAS;
said ICD is configured to monitor said WCI;
said ICD is configured to control said LDC in response to inputs from said WCI;
said ICD is configured with a web-browser interface permitting remote monitoring of said LFAS via said. WCI;
said ICD is configured with a web-browser interface permitting remote control of said LDC vie said WCI;
said ICD is configured to execute instructions stored in a lamp fixture adapter program (LFAP);
said LFAP is configured to allow local control and monitoring of said LDC in response to inputs from said LFAS;
said LFAP is configured to allow local control and monitoring of said LFAS in response to inputs from said WCI;
said LFAP is configured to allow said LFAS to be monitored and controlled by said web-browser interface;
said LEAP is configured to allow reporting of LFAS detected events to said WCI;
said LFAP is configured to be remotely programmable via said CI via said web-browser interface; and
said ICD is configured to collect data from said LFAS based on configuration information defined by a web-browser interface hosted by said ICD and transmit said collected data to a remote computing device via said WCI thru a wireless router
wherein said method comprises the steps of:
(1) Determining if a computer network is available, and if not, proceeding to step (5);
(2) Connecting to said computer network;
(3) Establishing a web-based Internet security monitoring and control interface;
(4) Loading said LFAP from a web-server based on a user configuration setup;
(5) Executing LFAP instructions on said ICD to monitor said LFAS and control said LDC;
(6) Determining if a LFAS event has occurred and if not, proceeding to step (8);
(7) Reporting said event and/or sending data to a web-based remote interface;
(8) Determining if LDC control is required by a local or remote control instruction, and if not, proceeding to step (1);
(9) Executing a dimming instruction protocol on said LDC based on LFAS input;
(10) Determining if LFAS data or relayed data from another LFA has been received, and if not proceeding to step (1); and
(11) Forwarding LFAS data to a target data recipient over the Internet and proceeding to step (1).

8. The security monitoring method of claim 7 wherein said SEIC comprises an E26 light bulb socket and said SEOC comprises an E26 light bulb receptacle.

9. The security monitoring method of claim 7 wherein said data collection is determined by data read from said LFAS by said ICD.

10. The security monitoring method of claim 7 wherein said WCI is configured to communicate with other light fixture adapters (LFAs) via a wireless communication network.

11. The security monitoring method of claim 7 wherein said WCI is configured to operate as a router within a group of light fixture adapters (LFAs).

12. The security monitoring method of claim 7 wherein operation of said LDC is determined by the state of a wall mounted electrical switch that is sensed by an ICD in a remote LFA.

13. A tangible non-transitory computer usable medium having computer-readable program code means comprising a security monitoring method wherein said method controls a security monitoring system comprising:
(a) source electrical input connector (SEIC);
(b) sink electrical output, connector (SEOC);
(c) lamp dimmer control (LDC);
(d) integrated computing device (ICD);
(e) light fixture adapter sensor (LFAS); and
(f) wireless communication interface (WCI);
wherein:
said SEIC, said SEOC, said LDC, said ICD, said LFAS, and said WCI are contained within a cylindrical housing configured to be installed between an existing electrical lamp and an existing electrical lamp fixture;
said LDC is configured to control the flow of electrical current from said SEIC to said SEOC under direction of said ICC;
said LFAS comprises an imaging sensor;
said ICD is configured to monitor said LFAS;
said ICD is configured to control said LDC in response to inputs from said LFAS;
said ICD is configured to monitor said WCI;
said ICD is configured to control said LDC in response to inputs from said WCI;
said ICD is configured with a web-browser interface permitting remote monitoring of said LFAS via said WCI;
said ICD is configured with a web-browser interface permitting remote control of said LDC via said WCI;
said ICD is configured to execute instructions stored in a lamp fixture adapter program (LFAP);
said LFAP is configured to allow local control and monitoring of said LDC in response to inputs from said LFAS;
said LFAP is configured to allow local control and monitoring of said LFAS in response to inputs from said WCI;
said LFAP is configured to allow said LFAS to be monitored and controlled by said web-browser interface;
said LFAP is configured to allow reporting of LFAS detected events to said WCI;
said LFAP is configured to be remotely programmable via said WCI via said web-browser interface; and
said ICD is configured to collect data from said LFAS based on configuration information defined by a web-browser interface hosted by said ICC and transmit said collected data to a remote computing device via said WCI thru a wireless router
wherein said method comprises the steps of:
(1) Determining if a computer network is available, and if not, proceeding to step (5);
(2) Connecting to said computer network;
(3) Establishing a web-based Internet security monitoring and control interface;
(4) Loading said LFAP from a web-server based on a user configuration setup;
(5) Executing LFAP instructions on said ICD to monitor said LFAS and control said LCD;
(6) Determining if a LFAS event has occurred and if not, proceeding to step (8);
(7) Reporting said event and/or sending data to a web-based remote interface;
(8) Determining if LDC control is required by a local or remote control instruction, and if not, proceeding to step (1);
(9) Executing a dimming instruction protocol on said LDC based on LFAS input;
(10) Determining if LFAS data or relayed data from another LFA has been received, and if not, proceeding to step (1); and
(11) Forwarding LFAS data to a target data recipient over the Internet, and proceeding to step (1).

14. The computer usable medium of claim 13 wherein said SEIC comprises an E26 light bulb socket and said SEOC comprises an E26 light bulb receptacle.

15. The computer usable medium of claim 13 wherein said data collection is determined by data read from said LFAS by said ICD).

16. The computer usable medium of claim 13 wherein said WCI is configured to communicate with other light fixture adapters (LFAs) via a wireless communication network.

17. The computer usable medium of claim 13 wherein said WCI is configured to operate as a router within a group of light fixture adapters (LFAs).

18. The computer usable medium of claim 13 wherein operation of said LDC is determined by the state of a wall mounted electrical switch that is sensed by an ICD in a remote LFA.

\* \* \* \* \*